(12) United States Patent
Baba

(10) Patent No.: US 9,448,540 B2
(45) Date of Patent: Sep. 20, 2016

(54) SATELLITE SIGNAL RECEIVING DEVICE, ELECTRONIC TIMEPIECE, AND SATELLITE SIGNAL RECEIVING METHOD

(71) Applicant: Seiko Epson Corporation, Tokyo (JP)

(72) Inventor: Norimitsu Baba, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/633,711

(22) Filed: Feb. 27, 2015

(65) Prior Publication Data
US 2015/0253742 A1    Sep. 10, 2015

(30) Foreign Application Priority Data

Mar. 7, 2014  (JP) .................................. 2014-045498

(51) Int. Cl.
| | |
|---|---|
| *G04R 20/04* | (2013.01) |
| *G04R 20/02* | (2013.01) |
| *G01S 19/24* | (2010.01) |
| *G01S 19/28* | (2010.01) |

(52) U.S. Cl.
CPC .............. *G04R 20/02* (2013.01); *G01S 19/24* (2013.01); *G01S 19/28* (2013.01); *G04R 20/04* (2013.01)

(58) Field of Classification Search
CPC ...... G04R 20/02; G04R 20/04; G04R 20/06; G01S 19/252; G01S 19/24; G01S 19/28
See application file for complete search history.

(56) References Cited

U.S. PATENT DOCUMENTS

| | | | | |
|---|---|---|---|---|
| 4,717,260 | A  * | 1/1988 | Tsuji ................... | G04B 19/223 368/21 |
| 5,724,316 | A  * | 3/1998 | Brunts ............... | G01C 21/3697 340/988 |
| 6,898,152 | B2 * | 5/2005 | Chan .................... | G04R 20/10 368/47 |
| 8,620,306 | B2 * | 12/2013 | Pon ........................ | G01S 19/06 342/357.2 |
| 2003/0189876 | A1* | 10/2003 | Chan .................... | G04R 20/10 368/47 |
| 2009/0318167 | A1* | 12/2009 | Pon ...................... | G01S 19/252 455/456.2 |
| 2010/0207815 | A1* | 8/2010 | Lee ......................... | G01S 19/49 342/357.67 |
| 2014/0241131 | A1 | 8/2014 | Honda | |
| 2014/0247700 | A1 | 9/2014 | Honda | |
| 2015/0071041 | A1* | 3/2015 | Akiyama ............... | G04R 20/04 368/47 |
| 2015/0146503 | A1 | 5/2015 | Nakanishi | |

FOREIGN PATENT DOCUMENTS

JP           10-010251 A        1/1998

(Continued)

*Primary Examiner* — Sean Kayes

(57) ABSTRACT

A satellite signal receiving device including: a reception unit is configured to search for positioning information satellites including a GNSS satellite used in a global navigation satellite system and an RNSS satellite used in a regional navigation satellite system, and receive satellite signal transmitted from a satellite locked onto by the search; a reception control unit is configured to control the reception unit; and a region determination unit is configured to determine whether or not the current location is in a region where satellite signal transmitted from the RNSS satellite can be received; the reception control unit prioritizing searching for an RNSS satellite when the region determination unit determines the current location is in a region where satellite signal transmitted from the RNSS satellite can be received.

12 Claims, 16 Drawing Sheets

(56) References Cited

FOREIGN PATENT DOCUMENTS

| JP | 2004-028593 A | 1/2004 |
| JP | 2006-071469 A | 3/2006 |
| JP | 2006-317225 A | 11/2006 |
| JP | 2013-181915 A | 9/2013 |
| JP | 2014-163706 A | 9/2014 |
| JP | 2014-169869 A | 9/2014 |
| JP | 2014-173921 A | 9/2014 |
| JP | 2014-196952 A | 10/2014 |
| JP | 2015-102530 A | 6/2015 |

* cited by examiner

MAIN FRAME

TLM (telemetry) WORD

HOW (handover) WORD

| TIME ZONE | SECOND POSITION | CITY | SEARCH PRIORITY |
|---|---|---|---|
| −12 | 33 | BAKER | GPS |
| −11 | 35 | MIDWAY | GPS |
| −10 | 37 | HONOLULU | GPS |
| −9.5 | 39 | MARQUESAS | GPS |
| −9 | 41 | ANCHORAGE | GPS |
| −8 | 43 | LOS ANGELES | GPS |
| −7 | 45 | DENVER | GPS |
| −6 | 47 | CHICAGO | GPS |
| −5 | 49 | NEW YORK | GPS |
| −4.5 | 50 | CARACAS | GPS |
| −4 | 51 | SANTIAGO | GPS |
| −3.5 | 52 | St.JOHN'S | GPS |
| −3 | 53 | RIO DE JANEIRO | GPS |
| −2 | 55 | FERNANDO DE NORONHA | GPS |
| −1 | 57 | AZORES | GPS |
| 0 | 0 | LONDON | GPS |
| +1 | 2 | PARIS | GPS |
| +2 | 4 | CAIRO | GPS |
| +3 | 6 | MOSCOW | GPS |
| +3.5 | 7 | TEHRAN | GPS |
| +4 | 8 | DUBAI | GPS |
| +4.5 | 9 | KABUL | GPS |
| +5 | 10 | KARACHI | GPS |
| +5.5 | 11 | DELHI | GPS |
| +5.75 | 12 | KATHMANDU | GPS |
| +6 | 13 | DHAKA | GPS |
| +6.5 | 14 | YANGON | GPS |
| +7 | 15 | BANGKOK | GPS |
| +8 | 17 | HONGKONG | GPS |
| +9 | 19 | TOKYO | QZSS |
| +9.5 | 20 | ADELAIDE | QZSS |
| +10 | 21 | SYDNEY | QZSS |
| +10.5 | 22 | LORD HOWE | QZSS |
| +11 | 23 | NOUMEA | QZSS |
| +11.5 | 24 | NORFOLK | QZSS |
| +12 | 25 | WELLINGTON | GPS |
| +12.75 | 27 | CHATHAM | GPS |
| +13 | 28 | NUKU'ALOFA | GPS |
| +14 | 30 | KIRITIMATI | GPS |

| SEARCH ORDER | SATELLITE NUMBER (PRN) | SATELLITE SYSTEM |
|---|---|---|
| 1 | 193 | QZSS |
| 2 | 194 | QZSS |
| 3 | 1 | GPS |
| 4 | 2 | GPS |
| 5 | 3 | GPS |
| : | : | GPS |
| 34 | 32 | GPS |

FIG. 9B

| SEARCH ORDER | SATELLITE NUMBER (PRN) | SATELLITE SYSTEM |
|---|---|---|
| 1 | 1 | GPS |
| 2 | 2 | GPS |
| 3 | 3 | GPS |
| : | : | GPS |
| 32 | 32 | GPS |

| STEP | SENSITIVITY THRESHOLD | SEARCH TIME PER SATELLITE | SEARCH TIME PER CYCLE |
|---|---|---|---|
| 1 | −130dBm | 0.3 s | 10.2 s |
| 2 | −135dBm | 0.6 s | 20.4 s |
| 3 | −140dBm | 0.9 s | 30.6 s |

FIG. 10

|   | 1 | 2 | 3 | 4 | 5 | 6 | 7 | 8 |
|---|---|---|---|---|---|---|---|---|
| A | GPS | GPS | GPS | QZSS | QZSS | QZSS | GPS | GPS |
| B | GPS | GPS | GPS | QZSS | QZSS | QZSS | GPS | GPS |
| C | GPS | GPS | GPS | QZSS | QZSS | QZSS | GPS | GPS |
| D | GPS | GPS | QZSS | QZSS | QZSS | QZSS | QZSS | GPS |
| E | GPS | GPS | QZSS | QZSS | QZSS | QZSS | QZSS | GPS |
| F | GPS | GPS | QZSS | QZSS | QZSS | QZSS | QZSS | GPS |
| G | GPS | GPS | QZSS | QZSS | QZSS | QZSS | QZSS | GPS |
| H | GPS | GPS | QZSS | QZSS | QZSS | QZSS | QZSS | GPS |
| I | GPS | GPS | QZSS | QZSS | QZSS | QZSS | QZSS | GPS |
| J | GPS | GPS | QZSS | QZSS | QZSS | QZSS | QZSS | GPS |

| SEARCH ORDER | SATELLITE NUMBER (PRN) | SATELLITE SYSTEM |
|---|---|---|
| 1 | 5 | GPS |
| 2 | 196 | QZSS |
| 3 | 193 | QZSS |
| 4 | 194 | QZSS |
| 5 | 1 | GPS |
| 6 | 2 | GPS |
| 7 | 3 | GPS |
| : | : | GPS |
| 34 | 32 | GPS |

FIG. 13B

| SEARCH ORDER | SATELLITE NUMBER (PRN) | SATELLITE SYSTEM |
|---|---|---|
| 1 | 5 | GPS |
| 2 | 196 | QZSS |
| 3 | 1 | GPS |
| 4 | 2 | GPS |
| 5 | 3 | GPS |
| : | : | GPS |
| 32 | 32 | GPS |

FIG. 15A

| SEARCH ORDER | SATELLITE NUMBER (PRN) | SATELLITE SYSTEM |
|---|---|---|
| 1 | 193 | QZSS |
| 2 | 194 | QZSS |
| 3 | 195 | QZSS |
| 4 | 196 | QZSS |
| 5 | 197 | QZSS |

FIG. 15B

| SEARCH ORDER | SATELLITE NUMBER (PRN) | SATELLITE SYSTEM |
|---|---|---|
| 1 | 1 | GPS |
| 2 | 2 | GPS |
| 3 | 3 | GPS |
| : | : | GPS |
| 32 | 32 | GPS |

SATELLITE SIGNAL RECEIVING DEVICE, ELECTRONIC TIMEPIECE, AND SATELLITE SIGNAL RECEIVING METHOD

BACKGROUND

1. Technical Field

The present invention relates to a satellite signal receiving device, an electronic timepiece, and a satellite signal receiving method for receiving satellite signals transmitted from positioning information satellites such as GPS satellites and Quasi-Zenith Satellites.

2. Related Art

Operation of the Quasi-Zenith Satellite System (QZSS) has started in Japan to augment the Global Positioning System (GPS) that uses GPS satellites. Because the quasi-zenith satellites (QZS) used in the Quasi-Zenith Satellite System transmit signals compatible with the L1 C/A signals used by the GPS system, a quasi-zenith satellite can also be used as a GPS satellite.

The Quasi-Zenith Satellite System is a satellite system that uses a combination the quasi-zenith satellites on plural orbits (quasi-zenith orbits) so that one satellite is always near the zenith over Japan. The path of the quasi-zenith satellites orbits the Earth on the same period as the rotation of the Earth on a specific inclination (the inclination of the orbital plane to the equatorial plane). As a result, the satellites follow an asymmetrical figure-8 pattern as shown in FIG. 16.

Because a quasi-zenith satellite is always near the zenith in Japan, the possibility of being able to receive a signal from a quasi-zenith satellite is high even in locations where GPS satellites are hidden by mountains or buildings.

Because a quasi-zenith satellite can only remain at a high latitude position for part of its orbital period, three or more satellites are planned to be placed in orbit on the same path so that one quasi-zenith satellite is always stationed above Japan. A Quasi-Zenith Satellite System of four satellites will be deployed with three satellites on a quasi-zenith orbit and one satellite on a geostationary orbit. As a result, at least one quasi-zenith satellite will always be located above Japan, and the probability of successful reception should be improved.

To shorten the time required for positioning in a cold start mode, which occurs when operation starts with no satellite orbit information stored locally, JP-A-2006-317225 discloses a satellite signal receiver that receives signals transmitted from a quasi-zenith satellite described above.

The satellite signal receiver disclosed in JP-A-2006-317225 includes a quasi-zenith satellite search unit that locates a quasi-zenith satellite, and a non-quasi-zenith satellite that locates a non-quasi-zenith satellite after the quasi-zenith satellite search unit finds a quasi-zenith satellite.

However, with the satellite signal receiver (satellite signal receiving device) described in JP-A-2006-317225, the search for a quasi-zenith satellite always occurs before the search for a non-quasi-zenith satellite (such as a GPS satellite). More specifically, JP-A-2006-317225 assumes that reception will only occur in locations where a quasi-zenith satellite is stationed directly overhead, such as by a car navigation system for automobiles used in Japan. As a result, JP-A-2006-317225 does not anticipate use in devices such as wristwatches, for example, that may move with the user when travelling to a country where quasi-zenith satellites do not exist (are not used).

Therefore, if the satellite signal receiver described in JP-A-2006-317225 is used in a country where quasi-zenith satellite signals cannot be received, reception from non-quasi-zenith satellites will be delayed because quasi-zenith satellites that cannot be received are searched for first, the satellite search time becomes long, and reception time increases significantly.

This problem is not limited to satellite signal receivers that can receive signals from the quasi-zenith satellites used in Japan's Quasi-Zenith Satellite System (QZSS), and is shared by other satellite signal receiving devices that can receive signals from GNSS satellites used in the Global Navigation Satellite System (GNSS) similar to the GPS system, and RNSS satellites used in Regional Navigation Satellite Systems (RNSS), which can only be received in limited areas similarly to QZSS.

SUMMARY

A satellite signal receiving device, an electronic timepiece, and a satellite signal receiving method according to the present invention can receive GNSS satellite and RNSS satellite signals, and can shorten the satellite search time during a cold start.

A satellite signal receiving device according to one aspect of the invention is a satellite signal receiving device including a reception unit is configured to search for positioning information satellites including a GNSS satellite used in a global navigation satellite system and an RNSS satellite used in a regional navigation satellite system, and receive satellite signal transmitted from a satellite locked onto by the search; a reception control unit is configured to control the reception unit; and a region determination unit is configured to determine whether or not the current location is in a region where satellite signal transmitted from the RNSS satellite can be received; the reception control unit prioritizing searching for an RNSS satellite when the region determination unit determines the current location is in a region where satellite signal transmitted from the RNSS satellites can be received.

A GPS satellite is an example of a GNSS satellite in the group of positioning information satellites. A quasi-zenith satellite used in the Quasi-Zenith Satellite System (QZSS) that has started operation in Japan is an example of an RNSS satellite. The reception level of satellite signals transmitted from satellites located at a high angle of elevation is generally higher than the reception level of satellite signals from satellites located at a low angle of elevation. The reception level is higher at higher angles of elevation because the distance from the satellite to the receiver is shorter, and there is less attenuation through space. In a satellite signal receiving device that can receive satellite signals from both GPS satellites and quasi-zenith satellites, the reception level of satellite signals transmitted from quasi-zenith satellites is higher than the reception level of satellite signals transmitted from GPS satellites, which are at a lower angle of elevation than quasi-zenith satellites, when a quasi-zenith satellite is located near the zenith. When satellite signals transmitted from positioning information satellites are received and positioning information is acquired therefrom and stored in a storage unit, one example of a region determination unit determines whether or not the current location is in a region where satellite signal transmitted from the RNSS satellite can be received based on the stored positioning information.

When the process starts, the reception control unit controls the reception unit to search for a positioning information satellite. If operation starts from a cold start, the reception control unit must look for all of the positioning information satellites. In this event, the reception control unit prioritizes searching for RNSS satellites if the region determination unit determines that the current location is in a region where satellite signal transmitted from the RNSS satellite can be received.

As a result, the likelihood of quickly finding and locking onto an RNSS satellite increases, and the positioning information satellite search process and the satellite signal reception process can be shortened compared with not receiving signals from an RNSS satellite or not prioritizing an RNSS satellite search.

More specifically, when acquiring time information, the time information can be acquired by receiving satellite signals from one positioning information satellite. Therefore, if satellite signal transmitted from the RNSS satellite can be received in the current region, an RNSS satellite can be quickly found and the satellite signal reception time can be shortened by prioritizing searching for RNSS satellites.

Furthermore, when acquiring positioning information, satellite signals must be received from at least three, and preferably four, positioning information satellites. Therefore, by prioritizing searching for RNSS satellites in a region where signals from RNSS satellites can be received, an RNSS satellite can be quickly locked as one of the four satellites, and GPS satellites can be found as the other three satellites. Therefore, compared with locking onto four GNSS satellites, the positioning information satellite search time can be shortened, and the satellite signal reception time can be shortened.

Furthermore, if the region determination unit determines that the current location is not in a region where satellite signal transmitted from the RNSS satellite can be received, the reception control unit does not prioritize searching for RNSS satellites. In this event, the reception control unit searches for a GNSS satellite first, and then searches for an RNSS satellite. As a result, a GNSS satellite can be found and locked before searching for RNSS satellites from which signals cannot be received. Therefore, the probability of completing the search process before starting a search process for RNSS satellites increases even when the current location is not in a region where satellite signal transmitted from the RNSS satellite can be received, the positioning information satellite search time can be shortened, and the satellite signal reception time can be shortened.

Power consumption can also be reduced in the reception process by shortening the positioning information satellite search process (locking process) and the time required for the satellite signal reception process. When the satellite signal receiving device of the invention is incorporated in a mobile device, such as a wristwatch, that may travel with the user and execute the reception operation in different countries or locations, power consumption by the reception process can be reduced. As a result, the duration time of the power supply of a mobile device that is powered by a primary battery or a storage battery can be increased.

In a satellite signal receiving device according to another aspect of the invention, when the region determination unit determines the current location is in a region where satellite signal transmitted from the RNSS satellite can be received, the reception control unit searches for an RNSS satellite before half the number of positioning information satellites to search for.

In this aspect of the invention, when the region determination unit determines the current location is in a region where satellite signal transmitted from the RNSS satellite can be received, the reception control unit prioritizes receiving RNSS satellite signal, and searches for RNSS satellite before half the number of positioning information satellites that may be searched for. For example, when searching for a total 36 positioning information satellites, including 32 GPS satellites and 4 RNSS satellites, the reception control unit searches for RNSS satellites in search cycles 1 to 18.

Because this aspect of the invention can search for RNSS satellites that are located near the zenith and transmit signals with high reception sensitivity when searching for positioning information satellites, the average search time required to lock onto one or four positioning information satellites can be shortened. The power consumption required for searching can therefore be reduced.

A satellite signal receiving device according to another aspect of the invention preferably also has a storage unit is configured to store the positioning information satellite, the reception control unit searching for the positioning information satellite stored in the storage unit first, then searching for an RNSS satellite not stored in the storage unit, and then searching for a GNSS satellite not stored in the storage unit, when the region determination unit determines the current location is in a region where satellite signal transmitted from the RNSS satellite can be received.

Because this aspect of the invention has a storage unit that stores information about a positioning information satellite, the satellite number of the positioning information satellite that were locked in a previous reception process, or the positioning information satellite that are locked with successful reception, can be stored. Note that when a positioning information satellite could not be locked in the previous reception process, information about an earlier satellite may be stored. Further alternatively, when a positioning information satellite is locked in the previous reception process, the record of the previous successful reception may be deleted and overwritten, or reception date and time information may be added to accumulate a reception record of the last five reception processes, for example.

The reception control unit searches first for a positioning information satellite that is stored in the storage unit. If only a GNSS satellite is stored in the storage unit at this time, the stored GNSS satellite is searched for. If only an RNSS satellite is stored in the storage unit, the stored RNSS satellite is searched for.

Furthermore, if both a GNSS satellite and an RNSS satellite are stored, both are searched for. In this event, the RNSS satellite may be prioritized, or the GNSS satellite may be prioritized.

If the set number of satellites cannot be locked onto by searching for the positioning information satellites stored in the storage unit, an RNSS satellite not stored in the storage unit is searched for. If the set number of satellites cannot be locked onto even after searching for the RNSS satellite, a GNSS satellite not stored in the storage unit is searched for.

By thus prioritizing searching for positioning information satellites that are stored in the storage unit, the likelihood of being able to lock onto a positioning information satellite that was previously locked and received is higher if the reception process executes at the same time as the last time, and this aspect of the invention can shorten the time required to lock onto a positioning information satellite.

Furthermore, while locking onto the positioning information satellite stored in the storage unit may not be possible when reception is tried at a different time than the last reception time, because searching for RNSS satellites is prioritized over GNSS satellites, the time required to lock a positioning information satellite can be shortened compared with searching for GNSS satellites first.

The average search time needed to complete locking onto one or four positioning information satellites can therefore be shortened. Power consumption required for searching can also be reduced.

In a satellite signal receiving device according to another aspect of the invention, the reception control unit searches first for the RNSS satellite, and then searches for a GNSS satellite, when the region determination unit determines the current location is in a region where satellite signal transmitted from the RNSS satellite can be received.

When the region determination unit determines the current location is in a region where satellite signal transmitted from the RNSS satellites can be received, this aspect of the invention searches for RNSS satellites first. As a result, the likelihood of being able to lock onto an RNSS satellite first in the search process increases, the positioning information satellite search time can be shortened, and the power consumption required for the search can be reduced. Furthermore, when the set number of satellites cannot be locked by the search for RNSS satellites, this aspect of the invention additionally searches for GNSS satellites. As a result, when the number of RNSS satellites in operation is small and an RNSS satellite is not located where reception is possible, satellite signals from GNSS satellites can be received.

In a satellite signal receiving device according to another aspect of the invention, the reception control unit is configured to execute a timekeeping reception process that acquires current time information from the satellite signal, and a positioning reception process that acquires positioning information based on the satellite signal; and when the region determination unit determines the current location is in a region where satellite signal transmitted from the RNSS satellite can be received, the reception control unit prioritizes searching for the RNSS satellite during the timekeeping reception process, and does not prioritize searching for the RNSS satellite during the positioning reception process.

In this aspect of the invention, the reception control unit controls the reception unit to execute a timekeeping reception process or a positioning reception process. When the timekeeping reception process is executed in a region where satellite signal transmitted from the RNSS satellite can be received, the reception control unit prioritizes searching for RNSS satellites. However, in the positioning reception process, the reception control unit does not search for RNSS satellites first and instead prioritizes searching for GNSS satellites even in a region where satellite signal transmitted from the RNSS satellite can be received. Because time information can be acquired in the timekeeping reception process by receiving the satellite signal from one positioning information satellite, a positioning information satellite can be locked in a short time and the current time can be quickly acquired by searching for RNSS satellites first when an RNSS satellite can be locked onto.

The positioning reception process is normally executed after moving to a location in a different time zone. There are currently few countries or regions in all time zones where signals can be received from RNSS satellites. Therefore, when the user moves to a country or region in a different time zone, the likelihood of being able to receive signals from RNSS satellites is small. As a result, because the possibility of being able to receive satellite signal transmitted from the RNSS satellite is low even if RNSS satellite searching is prioritized, the time required to search for positioning information satellites can be shortened in the positioning reception process by not prioritizing searching for RNSS satellites. Therefore, the time required to lock onto the positioning information satellites, receive satellite signals, and calculate the current position based on the received satellite signals can be shortened.

A satellite signal receiving device according to another aspect of the invention includes a reception unit is configured to searche for positioning information satellites including a GNSS satellite used in a global navigation satellite system and an RNSS satellite used in a regional navigation satellite system, and receive satellite signal transmitted from a satellite locked onto by the search; a reception control unit is configured to control the reception unit; and a region determination unit is configured to determine whether or not the current location is in a region where satellite signal transmitted from the RNSS satellite can be received; the reception control unit searching only for the RNSS satellite when the region determination unit determines the current location is in a region where satellite signal transmitted from the RNSS satellite can be received.

In this aspect of the invention, the reception control unit searches only for RNSS satellites when the region determination unit determines the current location is in a region where satellite signal transmitted from the RNSS satellite can be received.

If operation starts from a cold start, the reception control unit normally look for all positioning information satellites, but if the region determination unit determines the current location is in a region where satellite signal transmitted from the RNSS satellite can be received, the reception control unit only looks for the RNSS satellite.

As a result, the possibility of quickly locking onto an RNSS satellite increases, and the positioning information satellite search process and the satellite signal reception time can be shortened compared with receiving signals from GNSS satellites.

More specifically, when acquiring time information, the time information can be acquired by receiving satellite signals from one positioning information satellite. Therefore, if satellite signal transmitted from the RNSS satellite can be received in the current region, an RNSS satellite can be quickly found and the satellite signal reception time can be shortened by searching for only RNSS satellites.

By searching only for RNSS satellites, the time required for the search process (locking process) and the satellite signal reception process can be shortened, and power consumption can be reduced in the reception process. When the satellite signal receiving device of the invention is incorporated in a mobile device, such as a wristwatch, that may travel with the user and execute the reception operation in different countries or locations, power consumption by the reception process can be reduced. As a result, the duration time of the power supply of a mobile device that is powered by a primary battery or a storage battery can be increased.

In a satellite signal receiving device according to another aspect of the invention, when the region determination unit determines the current location is not in a region where satellite signal transmitted from the RNSS satellite can be received, the reception control unit prioritizes searching for the GNSS satellite.

When the region determination unit determines the current location is not in a region where satellite signal transmitted from the RNSS satellite can be received, this aspect of the invention prioritizes searching for GNSS satellites, that is, positioning information satellites other than RNSS satellites. This configuration can prevent prioritizing searching for RNSS satellites when satellite signal transmitted from the RNSS satellite cannot be received, and the probability of being able to quickly lock onto a positioning information satellite increases because priority is given to searching for GNSS satellites from which signals can be received. The positioning information satellite search time can therefore be shortened, and power consumption required for searching can be reduced.

Even though the current location is in a region where satellite signal transmitted from the RNSS satellite can be received, the user may operate the external operating unit and mistakenly input information that the current location is not in a region where satellite signal transmitted from the RNSS satellite can be received. In this event, this aspect of the invention searches for RNSS satellites after searching for GNSS satellites. As a result, an RNSS satellite located at a high angle of elevation can be locked and satellite signals received even when GNSS satellites located at a low angle of elevation cannot be locked because the reception process is executed in a location surrounded by tall buildings, for example. Therefore, when running the positioning reception process that requires locking onto four positioning information satellites, for example, RNSS satellites can also be locked and as a result the reception process time can be shortened.

In a satellite signal receiving device according to another aspect of the invention, when the region determination unit determines the current location is not in a region where satellite signal transmitted from the RNSS satellite can be received, the reception control unit searches for only the GNSS satellite.

When the region determination unit determines the current location is not in a region where satellite signal transmitted from the RNSS satellite can be received, this aspect of the invention searches only for GNSS satellites, that is, positioning information satellites other than RNSS satellites. Because this configuration does not search for RNSS satellites from which signals cannot be received, the positioning information satellite search time can be shortened, and power consumption required for searching can be reduced.

A satellite signal receiving device according to another aspect of the invention preferably also has an external operating unit operated by a user; wherein the region determination unit determines whether or not the current location is in a region where satellite signal transmitted from the RNSS satellite can be received based on the time zone selected by the user operating the external operating unit.

If the satellite signal receiving device is disposed to an electronic timepiece, for example, the crown or a push button is an example of an external operating unit. Thus comprised, the time zone can be selected by operating the crown, button, or other external operating unit, and whether or not the current location is in a region where satellite signal transmitted from the RNSS satellite can be received can be determined based on the time zone. As a result, the user does not need to actually determine if the current location enables receiving signals from RNSS satellites, and set up is easy.

Note that selection of the time zone includes indirectly selecting the time zone. For example, if the time zones related to the country names, city names, or region names that are selected by the user are stored, the time zone is indirectly selected by the user selecting the country name, city name, or region name with the external operating unit, and whether or not the current location is in a region where satellite signal transmitted from the RNSS satellite can be received can be determined based on the time zone.

In a satellite signal receiving device according to another aspect of the invention, the reception control unit is configured to execute a timekeeping reception process that acquires current time information from the satellite signal, and a positioning reception process that acquires positioning information based on the satellite signal; and the region determination unit determines whether or not the current location is in a region where satellite signal transmitted from the RNSS satellite can be received based on positioning information acquired by successfully executing a previous positioning reception process.

In this aspect of the invention, the region determination unit automatically determines if the current location is in a region where satellite signal transmitted from the RNSS satellite can be received based on the positioning information acquired by a previous positioning reception process. As a result, the user can determine whether or not RNSS satellite signals can be received without operating an external operating unit. The user can therefore run the reception process more easily than when manually operating an external operating unit and user convenience can be improved.

A satellite signal receiving device according to another aspect of the invention preferably also has a display unit is configured to display the type of positioning information satellite locked onto.

In this aspect of the invention, the display unit displays that only an RNSS satellite is locked when only an RNSS satellite is locked in the positioning information satellite search process, displays that only a GNSS satellite is locked when only a GNSS satellite is locked, and displays that both an RNSS satellite and GNSS satellite are locked with both are locked.

As a result, by looking at the display unit, the user can easily know the type of positioning information satellite that is currently locked onto.

A satellite signal receiving device according to another aspect of the invention preferably also has an external operating unit operated by a user; the reception control unit selecting a positioning information satellite to search for by the reception unit based on user operation of the external operating unit.

In this aspect of the invention, the user can select the type of positioning information satellite to search for by operating an external operating unit. As a result, the user can search for the desired type of positioning information satellite, GNSS satellite or RNSS satellite, for example, and the operability and convenience of the satellite signal receiving device can be improved.

Another aspect of the invention is an electronic timepiece including the satellite signal receiving device described above, and a timekeeping unit is configured to keep time.

By having the satellite signal receiving device described above, this aspect of the invention can shorten the positioning information satellite search time and reduce power consumption. More particularly, because power consumption can be reduced in an electronic timepiece driven by a primary battery, the duration time of the electronic timepiece until the battery is depleted can be increased. Likewise in an electronic timepiece that has a storage battery and a generator such as a solar cell, the duration time when the battery is not charged by the generator can be increased compared with the related art. User convenience can therefore be improved.

Another aspect of the invention is a satellite signal receiving method of a satellite signal receiving device having a reception unit is configured to search for positioning information satellites including a GNSS satellite used in a global navigation satellite system and an RNSS satellite used in a regional navigation satellite system, and receive satellite signal transmitted from a satellite locked onto by the search, the satellite signal receiving method including: a region determination step of determining whether or not the current location is in a region where satellite signal transmitted from the RNSS satellite can be received; and a reception control step of prioritizing searching for the RNSS satellite in a reception process that receives the satellite signals when the region determination step determines the current location is in a region where satellite signal transmitted from the RNSS satellite can be received.

This aspect of the invention can shorten the positioning information satellite search time and reduce power consumption in the same way as the satellite signal receiving device and electronic timepiece described above.

Another aspect of the invention is a satellite signal receiving method of a satellite signal receiving device having a reception unit is configured to searche for positioning information satellites including a GNSS satellite used in a global navigation satellite system and an RNSS satellite used in a regional navigation satellite system, and receive satellite signal transmitted from a satellite locked onto by the search, the satellite signal receiving method including: a region determination step of determining whether or not the current location is in a region where satellite signal transmitted from the RNSS satellite can be received; and a reception control step of searching only for the RNSS satellite in a reception process that receives the satellite signals when the region determination step determines the current location is in a region where satellite signal transmitted from the RNSS satellite can be received.

This aspect of the invention can also shorten the positioning information satellite search time and reduce power consumption in the same way as the satellite signal receiving device and electronic timepiece described above.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 8 illustrates the relationship between time zones and regions where a quasi-zenith satellite priority search is performed.

FIG. 9A illustrates an example of a priority search for quasi-zenith satellites, and FIG. 9B illustrates an example of a search for GPS satellites only.

FIG. 10 shows the effect of applying an electronic timepiece according to the first embodiment of the invention.

FIG. 12 illustrates selecting a time zone in the second embodiment of the invention.

FIG. 13A illustrates an example of sequentially searching for stored positioning information satellites, quasi-zenith satellites, and GPS satellites, and FIG. 13B illustrates an example of sequentially searching for stored positioning information satellites and GPS satellites.

FIG. 15A illustrates an example of searching only for quasi-zenith satellites, and FIG. 15B illustrates an example of searching only for GPS satellites.

DESCRIPTION OF EMBODIMENTS

A preferred embodiment of the present invention is described below with reference to the accompanying figures.

Examples of GNSS satellites used in global navigation satellite systems include the GPS system (U.S.A.), GLONASS (Russia), Galileo (EU), and Beidou (China). Examples of RNSS satellites used in regional navigation satellite systems include QZSS (Japan), IRNSS (Indian Regional Navigational Satellite System) (India), DORIS (Doppler Orbitography and Radio-positioning Integrated by Satellite) (France), and Beidou (China).

In this embodiment of the invention, GPS satellites are used as an example of a GNSS satellite, and quasi-zenith satellites are used as an example of RNSS satellites. In other words, references to GPS satellites and QZS satellites in the following embodiments mean GNSS satellites and RNSS satellites, respectively.

Figure 1:
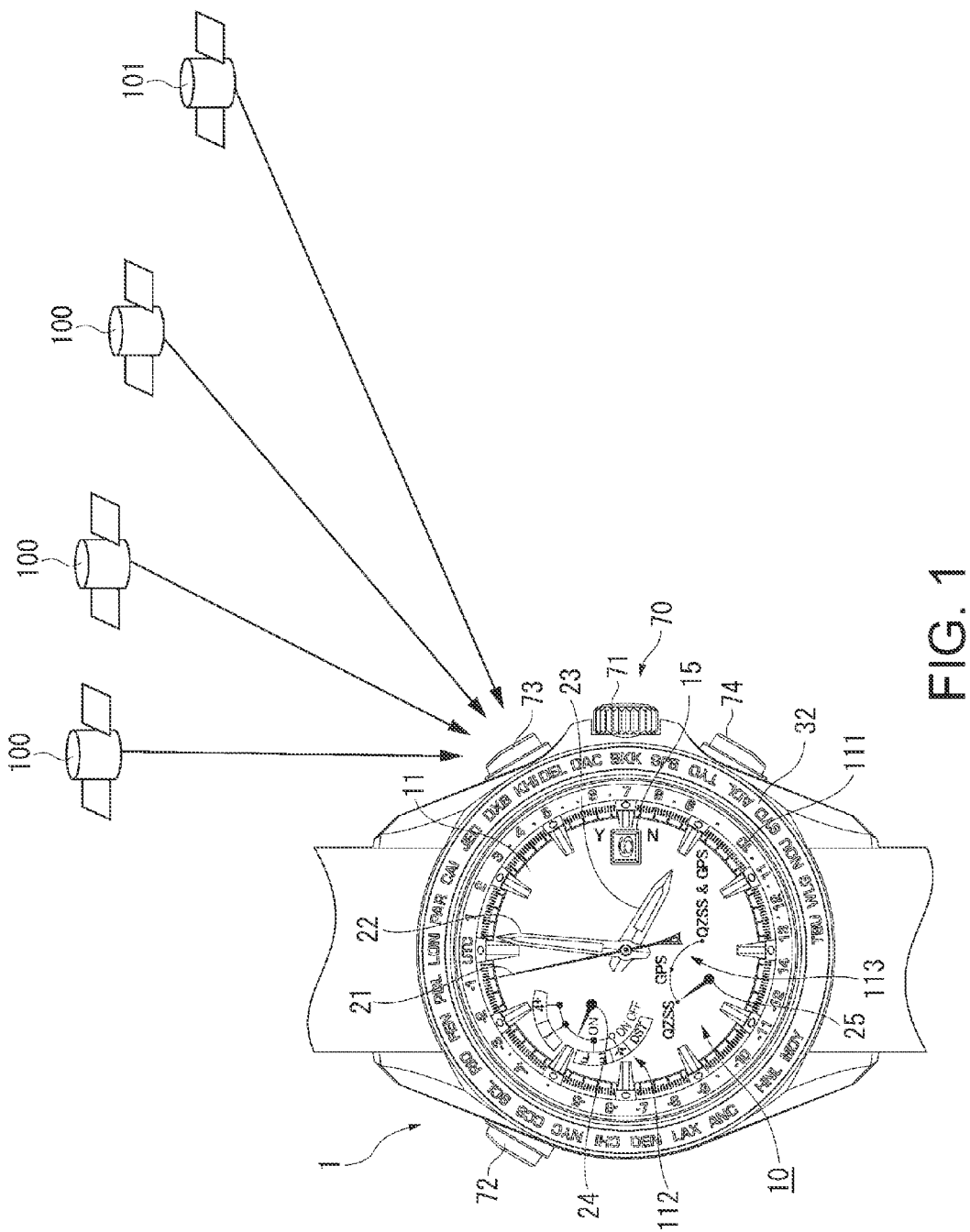
FIG. 1 is a plan view of an electronic timepiece according to the first embodiment of the invention.
Figure 2:
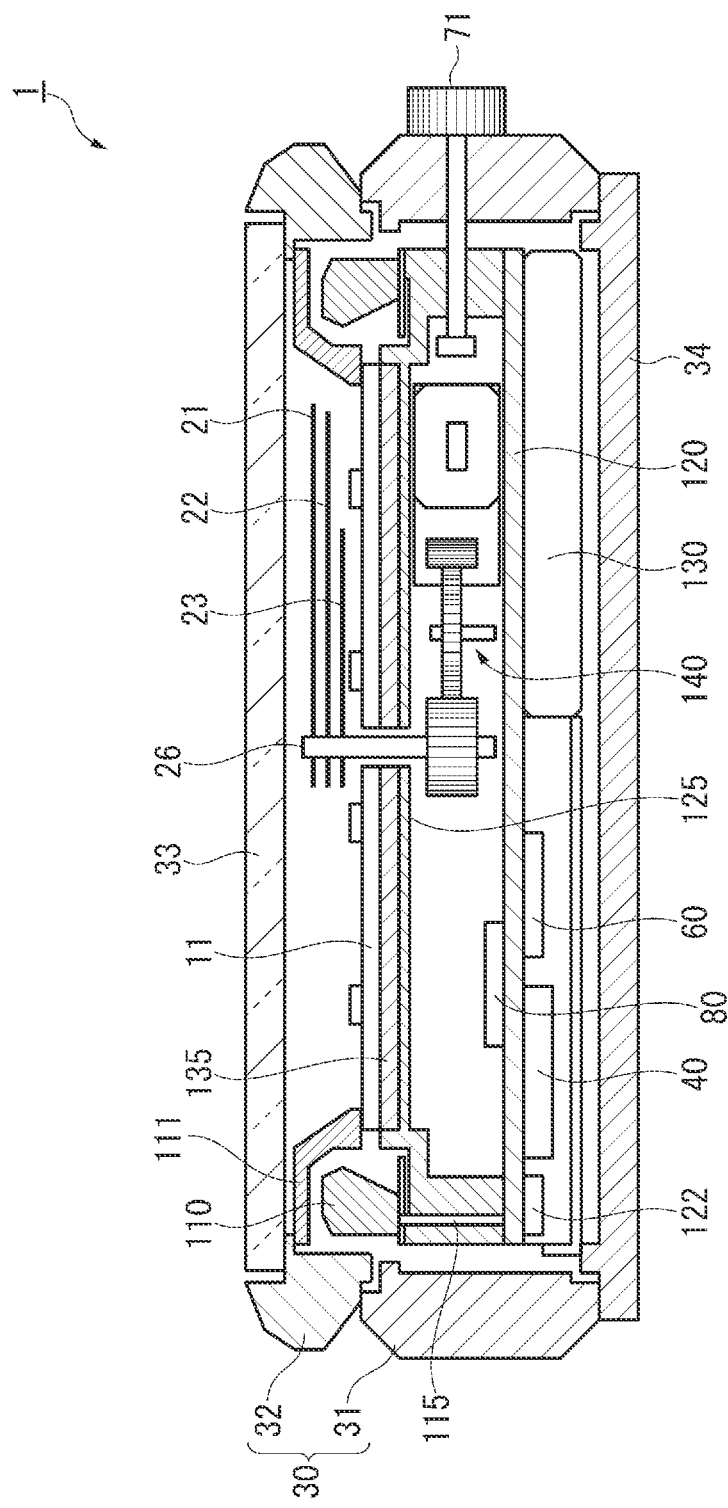
FIG. 2 is a basic section view of the electronic timepiece according to the first embodiment of the invention.

FIG. 1 is a plan view of an electronic timepiece 1 according to the first embodiment of the invention, and FIG. 2 is a section view of the electronic timepiece 1.

As shown in FIG. 1, an electronic timepiece 1 according to this embodiment is configured to receive satellite signals and acquire time information from at least one positioning information satellite (GPS satellite 100 or quasi-zenith satellites 101) in a constellation of multiple GPS satellites 100 or quasi-zenith satellites 101 orbiting the Earth on specific known orbits, and receive satellite signals from at least three positioning information satellites (GPS satellites 100 or quasi-zenith satellites 101) and calculate the current location.

Note that a GPS satellite 100 is an example of a positioning information satellite, and there are multiple positioning information satellites in orbit. A quasi-zenith satellite 101 is another example of a positioning information satellite, and there are plural quasi-zenith satellites in orbit. There are currently approximately 30 GPS satellites 100 in orbit, and multiple quasi-zenith satellites 101 in orbit.

Electronic Timepiece

The electronic timepiece 1 is a wristwatch that is worn on the user's wrist, has a display device 10 that indicates the time, for example, and an input device 70.

Electronic Timepiece Construction

The electronic timepiece 1 has an outside case 30 The outside case 30 has a bezel 32 made of ceramic fitted to a tubular case member 31 made of metal. Of the two openings to the outside case 30, a crystal 33 held by a bezel 32 covers the opening on the top or face side, and the opening on the back side is covered by a metal back cover 34.

On the inside of the outside case 30 are a dial ring 111 attached to the inside circumference of the bezel 32, an optically transparent dial 11, a center pivot 26 passing through the dial 11, hands 21, 22, 23 attached to the center pivot 26, and a drive mechanism 140 that drives the hands 21, 22, 23 and indicator hands 24, 25.

The center pivot 26 passes through the center of the outside case 30 in plan view, and is disposed to the center axis through the front and back.

The display device 10 includes the dial 11, hands 21, 22, 23, and indicator hands 24, 25.

The greater part of the dial 11 is made from a non-metallic material, such as plastic or glass, that is transparent to light and microwaves in the 1.5 GHz band.

The dial 11 includes a first subdial 112 corresponding to indicator hand 24, and a second subdial 113 corresponding to indicator hand 25.

The indicator hand 25 and second subdial 113 embody a display unit according to the invention as described below and in the claims.

The hands 21, 22, 23 are disposed to the face side of the dial 11. Hand 21 is the second hand, hand 22 is the minute hand, and hand 23 is the hour hand. These hands 21, 22, 23 and the dial 11 embody a basic analog timepiece that displays the time.

The indicator hand 24 is located in the area of 9:00 on the face of the dial 11, and indicates information by pointing to different positions on the first subdial 112.

DST on the first subdial 112 indicates daylight saving time. The electronic timepiece 1 is set to display DST on or off by using the pusher 72 and crown 71 to set the indicator hand 24 to the ON or OFF position in the DST range.

The airplane icon on the first subdial 112 indicates an in-flight mode. Satellite signal reception by the electronic timepiece 1 can be stopped by operating the pusher 72 and crown 71 to set the indicator hand 24 to the airplane icon and select the in-flight mode.

The E and F markers in the first subdial 112 indicate the reserve power of the battery.

The 1 and 4+ markers on the first subdial 112 indicate the reception mode. In the timekeeping mode (timekeeping reception process) for acquiring time information, the indicator hand 24 points to the 1. In the positioning mode (positioning reception mode) for acquiring positioning information, the indicator hand 24 points to 4+ on the first subdial 112. As a result, the user can know whether the electronic timepiece 1 is in the timekeeping mode or the positioning mode by looking at the first subdial 112.

Indicator hand 25 is located near 6:00 on the face of the dial 11, and indicates the type of positioning information satellite the electronic timepiece 1 can receive or lock onto by pointing to the appropriate position on the second subdial 113.

Dial Ring

A dial ring 111 is disposed around the dial 11. The dial ring 111 is disposed with the outside edge contacting the inside circumference edge of the bezel 32, and has a flat part on one side that is parallel to the crystal 33, and a beveled edge that slopes toward the dial 11 so that the inside edge contacts the dial 11. The flat part of the dial 11 is a ring with a conical shape when seen in section. A donut shaped storage space is formed by the flat part and the beveled part of the dial ring 111, and the inside circumference surface of the bezel 32, and a ring antenna 110 is housed in this storage space.

Markers (indices) for indicating the time with the hands 21, 22, 23, and numbers indicating the time difference of the time zone, are displayed on the dial ring 111. Abbreviations indicating the name of a city in each time zone are displayed on the bezel 32.

Input Device

The input device 70 functioning as the external operating unit of the invention includes the crown 71 and three pushers 72, 73, 74. Processes corresponding to manual operation of the input device 70 are executed when the input device 70 is operated.

More specifically, when the crown 71 is pulled out one stop, the second hand 21 jumps to indicate the current time zone setting. To change the currently set time zone, the crown 71 is turned from this state to the right to move the second hand 21 clockwise and sequentially select the time zone. Turning the crown 71 to the left sequentially selects the time zone −1 hour before. Pushing the crown 71 in confirms the selected time zone.

In other words, turning the crown 71 when pulled out one stop moves the second hand 21, and enables manually selecting the time zone by setting the second hand 21 to the time difference of the desired time zone indicated on the dial ring 111, or the city name of the desired time zone indicated on the bezel 32.

Turning the crown 71 right when pulled out to the second stop moves the hands 21, 22, 23, and enables manually setting the current time.

Pushing pusher 72 executes a process appropriate to the current operating state, such as cancelling the operating mode or interrupting the reception process.

When the pusher 73 is pressed for a first set time (such as 3 or more seconds and less than 6 seconds) and then released, a manual reception process (unconditional reception process) is executed in the timekeeping mode. During reception in this mode, the indicator hand 24 points to 1 indicating the timekeeping mode.

When the pusher 73 is pressed for a second set time (such as 6 seconds or more) that is longer than the first set time and then released, a manual reception process (unconditional reception process) is executed in the positioning mode. During reception in this mode, the indicator hand 24 points to 4+ indicating the positioning mode.

When the pusher 73 is pressed for a shorter time (such as less than 3 seconds) and then released, a result display process that displays the result of the previous reception process is executed. More specifically, the most recent reception process is displayed by the indicator hand 24 pointing to 1 or 4+. The reception result is indicated by the second hand 21 pointing to Y (reception success) or N (reception failure). Note that the Y is at the 13 second position, and the N is at the 18 second position in this embodiment of the invention.

The process executed when the pushers 72, 73, 74 are pressed are not limited to the foregoing, and may be set appropriately according to the function of the electronic timepiece 1.

Solar Panel

A solar panel 135 is that converts light energy to electrical energy is disposed between the dial 11 and a main plate 125 to which the drive mechanism 140 is disposed. The solar panel 135 is a round flat panel having plural solar cells (photovoltaic devices) that convert light energy to electrical energy (power) connected in series. The solar panel 135 also has a sunlight detection capability. A through-hole through which the center pivot 26 passes, and an aperture for a calendar window 15, are formed in the dial 11, solar panel 135, and main plate 125.

Drive Mechanism

The drive mechanism 140 is disposed to the main plate 125, and is covered by a circuit board 120 from the back side. The drive mechanism 140 includes a stepper motor that drives the second hand 21, a stepper motor that drives the minute hand 22 and the hour hand 23, a stepper motor that drives indicator hand 24, and a stepper motor that drives indicator hand 25.

The electronic timepiece 1 also has a date wheel that displays the date in the calendar window 15, and a stepper motor that drives the date wheel.

Circuit Board

The circuit board 120 includes a charging circuit 80, a storage device 60, a reception device (receiver module) 122 as the reception unit and information acquisition unit of the invention, and a control device 40. A storage battery 130 such as a lithium ion battery is disposed on the same side of the circuit board 120 as the reception device 122. The charging circuit 80 charges the storage battery 130 with the power produced by the solar panel 135. The circuit board 120 and the ring antenna 110 are connected using an antenna connection pin 115.

Antenna

The ring antenna 110 is formed by forming a metal antenna pattern by plating or a silver paste printing process on a ring-shaped dielectric substrate. The ring antenna 110 is disposed around the outside of the dial 11 on the inside circumference of the bezel 32, is covered by the plastic dial ring 111 and the crystal 33, and can therefore assure good reception. The dielectric can be made by mixing titanium oxide or other dielectric material that can be used at high frequencies with resin, which combined with the wavelength shortening effect of the dielectric can achieve a smaller antenna.

The ring antenna 110 is fed through the feed node, and the antenna connection pin 115 disposed on the back side of the ring antenna 110 is connected to this feed node. The antenna connection pin 115 is a pin-shaped connector made of metal, is implanted to the circuit board 120, and passes through the through-hole formed in the main plate 125 into the storage space described above. As a result, the circuit board 120 and the ring antenna 110 inside this storage space are connected by the antenna connection pin 115.

Circuit Configuration of the Electronic Timepiece

Figure 3:
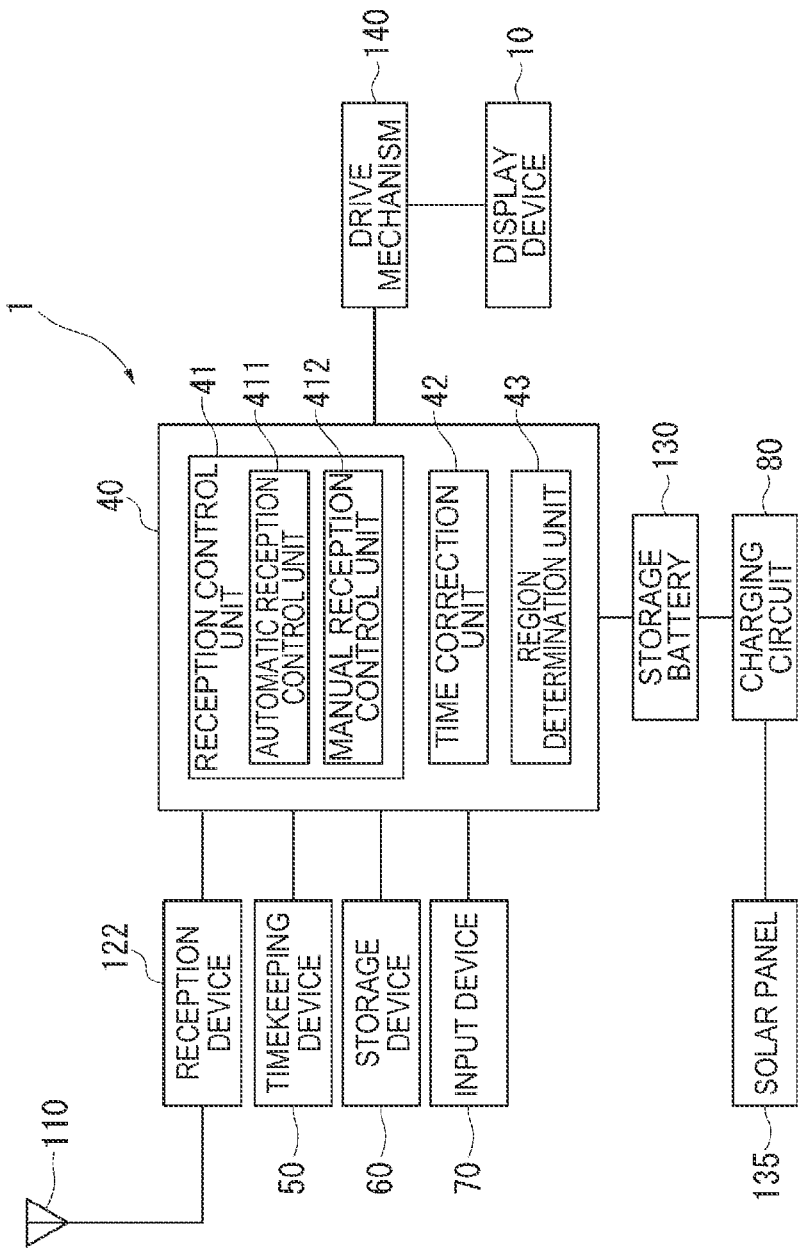
FIG. 3 is a block diagram illustrating the configuration of an electronic timepiece according to the first embodiment of the invention.

FIG. 3 is a block diagram illustrating the circuit configuration of the electronic timepiece 1. The electronic timepiece 1 includes a reception device 122, control device 40, timekeeping device 50 (timekeeping unit), storage device 60 (storage unit), and input device 70 (external operating unit).

The control device 40 includes a reception control unit 41, time correction unit 42, and region determination unit 43. The reception control unit 41 includes an automatic reception control unit 411, and a manual reception control unit 412.

Reception Device

The reception device 122 is a load that is driven by power stored in the storage battery 130, and when driven by the control device 40, receives satellite signals from a GPS satellite 100 or a quasi-zenith satellite 101 through the ring antenna 110. When satellite signal reception is successful, the reception device 122 sends the acquired information, such as the orbit information and GPS time information, to the control device 40. If satellite signal reception fails, the reception device 122 sends a failure report to the control device 40. Note that the configuration of the reception device 122 is the same as the configuration of a GPS receiver known from the literature, and further description thereof is omitted.

Timekeeping Device

The timekeeping device 50 includes a crystal oscillator driven by power stored in the storage battery 130, and updates time data using a reference signal based on the clock signal from the crystal oscillator.

Storage Device

Figure 4:
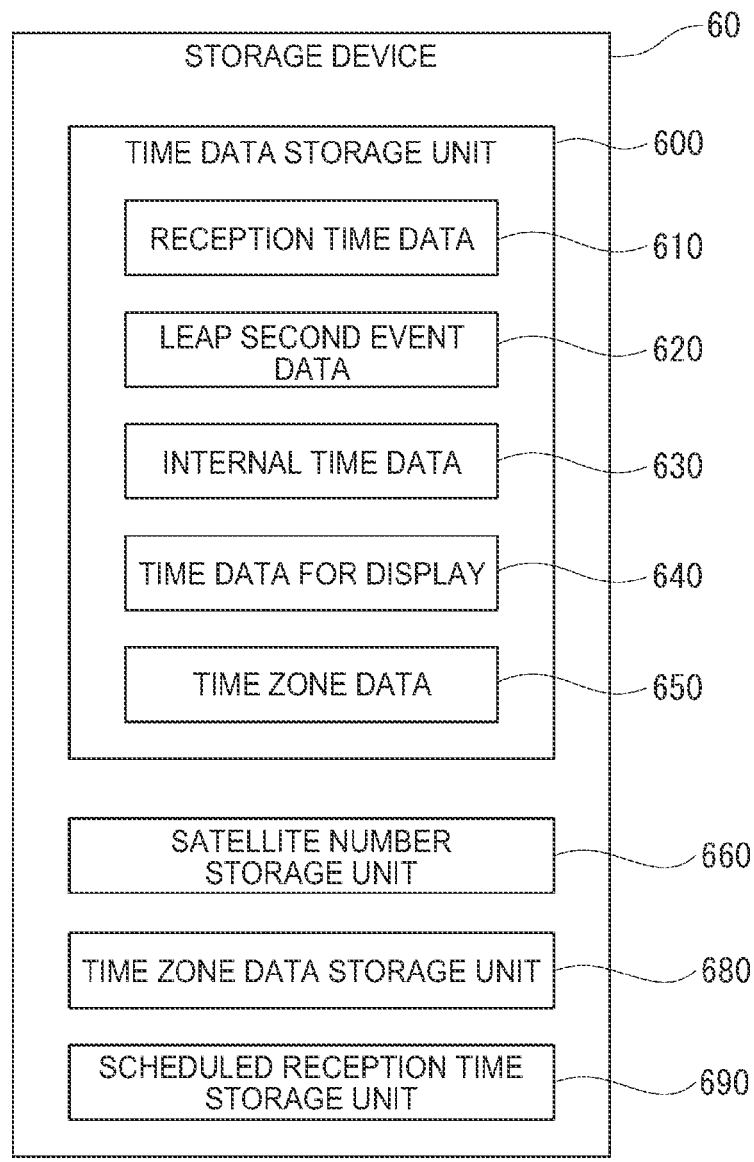
FIG. 4 is a block diagram illustrating the configuration of the storage device of the electronic timepiece according to the first embodiment of the invention.

As shown in FIG. 4, the storage device 60 includes a time data storage unit 600, a satellite number storage unit 660, a time zone data storage unit 680, and a scheduled reception time storage unit 690.

The time data storage unit 600 stores the reception time data 610, leap second event data 620, internal time data 630, time data for display 640, and time zone data 650.

Time information acquired from a satellite signal (GPS time) is stored in the reception time data 610. This reception time data 610 is normally updated every second by the timekeeping device 50, and is adjusted according to the acquired time information (GPS time) when a satellite signal is received.

At least the current leap second data is stored in the leap second event data 620. More specifically, the current leap second, the week number of the leap second event, the day number of the leap second event, and the future leap second values are contained as leap second related data on subframe 4, page 18 of the satellite signal (see FIG. 5). Of these values, at least the current leap second value is stored in the leap second event data 620.

The internal time is stored in the internal time data 630. The internal time is updated based on the GPS time stored in the reception time data 610, and the current leap second stored in the leap second event data 620. UTC (Coordinated Universal Time) is thus stored in the internal time data 630. This internal time information is also updated when the reception time data 610 is updated by the timekeeping device 50.

The time obtained by applying the time zone data (time difference information) stored in the time zone data 650 to the internal time information in the internal time data 630 is stored as the time data for display 640. The time zone data 650 is set manually by the user selection, or by the positioning information acquired when signals are received in the positioning mode.

The satellite numbers of the GPS satellites 100 or quasi-zenith satellites 101 for which the reception signal level (SNR: signal to noise ratio) was greater than or equal to a specific level (such as a SNR of 35 or more) in the group of GPS satellites 100 or quasi-zenith satellites 101 that were locked onto in the last reception process are stored in the satellite number storage unit 660. Note that the reception signal level can be expressed in dBm, which is a unit expressing signal strength. For example, a SNR of 35 is equivalent to approximately −137.5 dBm.

The time zone data storage unit 680 relationally stores positioning information (latitude and longitude) linked to the time zone information (time difference information). As a result, when positioning information is acquired in the positioning mode, the control device 40 can acquire the time zone based on the positioning information (latitude and longitude).

Note that city names and time zone data are relationally stored in the time zone data storage unit 680. Therefore, if the user selects the name of a city for which the current time is desired by operating the crown 71 or other input device 70 as described above, the control device 40 searches the time zone data storage unit 680 for the city name selected by the user, gets the time zone data corresponding to that city name, and sets the time zone data 650 accordingly.

The scheduled reception time at which the automatic reception control unit 411 runs the scheduled reception process is stored in the scheduled reception time storage unit 690. The time when reception initiated by manually operating the pusher 70 was last successful is stored as the scheduled reception time.

Note that the orbit information (almanac, ephemeris) of the positioning information satellite is not stored in the storage device 60. This is because the electronic timepiece 1 is a wristwatch, has limited capacity in the storage device 60 and limited capacity in the storage battery 130, and executing a long reception process to acquire the orbit information is difficult. The reception process of the electronic timepiece 1 is therefore executed during a cold start when the orbit information is not stored locally.

Note that while not shown in the figure, location information (latitude and longitude), that is, the current position of the electronic timepiece 1, acquired in the positioning reception process may be stored.

Control Device

The control device 40 is configured with a CPU that controls the electronic timepiece 1. The control device 40 includes a reception control unit 41 that controls the reception device 122 to run the reception process. The reception control unit 41 includes the automatic reception control unit 411 and the manual reception control unit 412. The control device 40 also has a time correction unit 42 that acquires the time information contained in the satellite signal received by the reception device 122, and adjusts the time kept by the reception time data 610 based on this time information. The control device 40 also includes a region determination unit 43 that determines the location of the country where the user is.

Automatic Reception Control Unit

When the scheduled reception time set in the scheduled reception time storage unit 690 is reached, and when the output voltage or the output current of the solar panel 135 reaches or exceeds a set level, the automatic reception control unit 411 operates the reception device 122 to run the reception process in the timekeeping mode.

More specifically, the automatic reception control unit 411 operates the reception device 122 when the kept time, and more specifically when the internal time data 630, reaches the scheduled reception time. This operation is called the scheduled reception process herein.

The automatic reception control unit 411 also operates the reception device 122 when the output voltage or the output current of the solar panel 135 reaches or exceeds a set level, and it can be determined that the solar panel 135 is outdoors exposed to sunlight. Note, further, that the number of times the reception device 122 is operated while the solar panel 135 is generating power may be limited to once a day.

The automatic reception control unit 411 locks onto at least one GPS satellite 100 or quasi-zenith satellite 101 by the reception device 122, receives satellite signals transmitted from the GPS satellite 100 or quasi-zenith satellite 101, and acquires time information. When acquiring the time information is successful, the time correction unit 42 adjusts the reception time data 610 based on the acquired time information.

Based on the time zone data 650 set manually by the user in a previous selection operation, or the time zone data 650 set based on the positioning information acquired in the positioning information reception process, the time information reception process of the automatic reception control unit 411 determines whether or not to prioritize searching for a quasi-zenith satellite 101, and based on this decision, searches for a GPS satellite 100 or quasi-zenith satellite 101 and receives satellite signals.

Manual Reception Control Unit

The manual reception control unit 412 operates the reception device 122 and runs the reception process when the user performs the unconditional reception operation by pushing pusher 73 of the input device 70.

In this event, the manual reception control unit 412 switches between the reception process in the timekeeping mode and the reception process in the positioning mode according to how long the pusher 73 is pressed as described above.

Like the automatic reception control unit 411, the manual reception control unit 412 locks onto at least one GPS satellite 100 or quasi-zenith satellite 101 by the reception device 122 in the reception process of the timekeeping mode, receives satellite signals transmitted from the GPS satellite 100 or quasi-zenith satellite 101, and acquires time information. When acquiring the time information is successful, the time correction unit 42 adjusts the reception time data 610 based on the acquired time information.

In the reception process of the positioning mode, the manual reception control unit 412 locks onto at least three, and preferably four or more, GPS satellites 100 or quasi-zenith satellites 101 by the reception device 122, receives the satellite signals transmitted from each of the GPS satellites 100 and quasi-zenith satellites 101 and acquires time information, and additionally computes and acquires the positioning information. If acquiring the positioning information is successful, the control device 40 acquires the time zone data (time difference information) from the time zone data storage unit 680 based on the acquired positioning information (latitude and longitude) and stores it in the time zone data 650.

For example, because Japan Standard Time (JST) is 9 hours ahead of UTC (UTC +9), if the positioning information acquired in the positioning mode indicates Japan, the control device 40 reads and stores the time difference (+9 hours) from the time zone data storage unit 680 in the time zone data 650. As a result, the time data for display 640 is the time equal to the internal time data 630, which is UTC, plus the time zone data.

Based on the time zone selected by the user operating the input device 70 as controlled by the reception control unit 41, the time zone data 650 stored in the time data storage unit 600 of the storage device 60, or the positioning information acquired by the positioning reception process, the region determination unit 43 determines if the current location is a region where a satellite signal can be received from a quasi-zenith satellite 101.

Navigation Message (GPS Satellite)

The format of a navigation message contained in the satellite signals sent from a GPS satellite 100 containing the acquired information described above is described next. Note that the navigation message is modulated at 50 bps onto the satellite signal carrier.

Figure 5A:
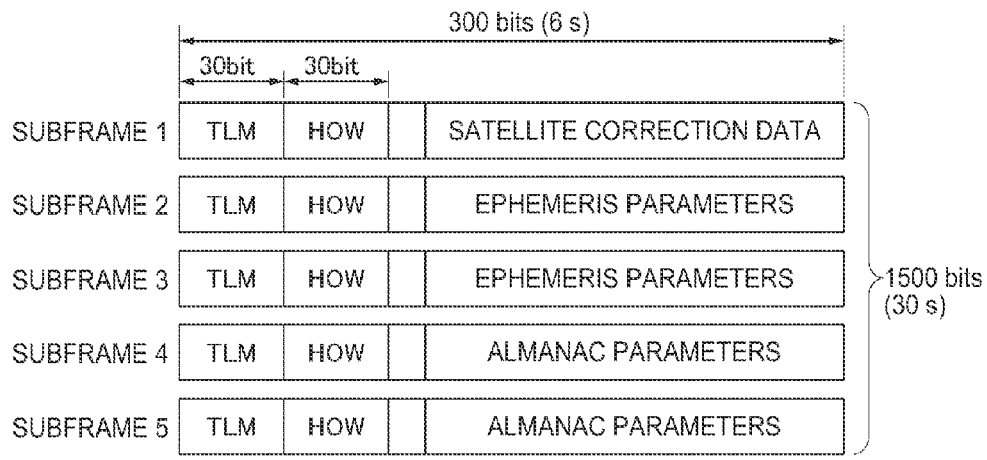
FIGS. 5A-5C illustrate the structure of a navigation message.
Figure 5B:
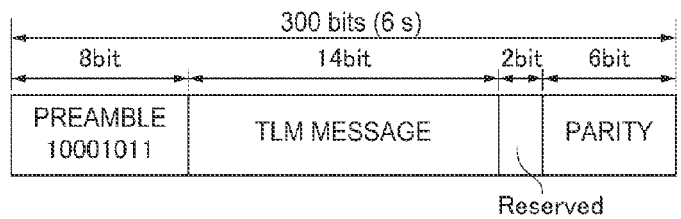
Figure 5C:
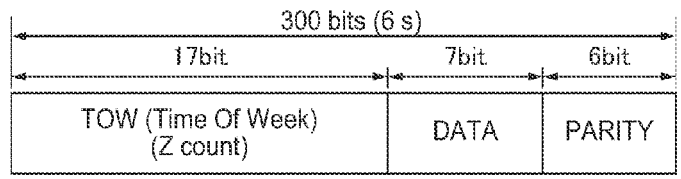

FIG. 5A to FIG. 5C illustrate the format of the navigation message.

As shown in FIG. 5A, a navigation message is composed of main frame units each containing 1500 bits. Each main frame is divided into five subframes 1 to 5 of 300 bits each. The data in one subframe is transmitted in 6 seconds from a GPS satellite 100. It therefore takes 30 seconds for the data in one main frame to be transmitted from a GPS satellite 100.

Subframe 1 contains the week number (WN) and satellite correction data.

The week number identifies the week to which the current GPS time information belongs, and is updated every week.

Subframes 2 and 3 contain ephemeris data (detail orbit information for each GPS satellite 100). Subframes 4 and 5 contain almanac data (coarse orbit information for all GPS satellites 100).

Each of subframes 1 to 5 starts with a telemetry (TLM) word storing 30 bits of telemetry data followed by a HOW word (handover word) storing 30 bits of handover data.

Therefore, while the TLM and HOW words are transmitted at 6-second intervals from the GPS satellites 100 or quasi-zenith satellites 101, the week number data and other satellite correction data, ephemeris parameter, and almanac parameter are transmitted at 30-second intervals.

As shown in FIG. 5B, the TLM word contains a preamble, a TLM message and reserved bits, and parity data.

As shown in FIG. 5C, the HOW word contains GPS time information called the TOW or Time of Week (also called the Z count). The Z count denotes in seconds the time passed since 00:00 of Sunday each week, and is reset to 0 at 00:00 Sunday the next week. More specifically, the Z count denotes the time passed from the beginning of each week in seconds. The Z count denotes the GPS time at which the first bit of the next subframe data is transmitted.

The electronic timepiece 1 can therefore acquire date information and time information by retrieving the week number contained in subframe 1 and the HOW word (Z count data) contained in subframes 1 to 5. However, if the week number data was previously received and the time passed from when the week number was acquired is counted internally, the electronic timepiece 1 can know the current week number value of the GPS satellite 100 time without acquiring the week number from a satellite signal again.

It is therefore sufficient for the electronic timepiece 1 to acquire the week number value from subframe 1 only when week number data (date information) is not already stored internally, such as after a device reset or when the power is first turned on. If week number data is stored, the electronic timepiece 1 can know the current time by acquiring the TOW value transmitted every 6 seconds. As a result, the electronic timepiece 1 normally acquires only the TOW as the time information.

As described above, the leap second data is stored by acquiring the current leap second contained on subframe 4, page 18. The week number and the day number of the leap second event, and the future leap second value, are also stored on page 18 in subframe 4, and these values report the timing for updating the leap second value before the leap second is to be updated. Updating the leap second normally occurs on the last day of December or June. As a result, by executing the leap second data acquisition process and receiving page 18 of subframe 4 at a scheduled time before the last day of December or June, the electronic timepiece 1 can know whether or not to update the leap second, and the leap second correction value if updating is required.

Navigation Message (Quasi-Zenith Satellite)

The navigation message in satellite signals transmitted from quasi-zenith satellites 101 are designed to be as interchangeable as possible with GPS satellite signals. Some data specific to quasi-zenith satellites 101 is different, however. Further detailed description of the navigation message is omitted.

Reception Process

The reception process of the electronic timepiece 1 is described next with reference to the flow charts in FIG. 6 and FIG. 7.

Figure 6:
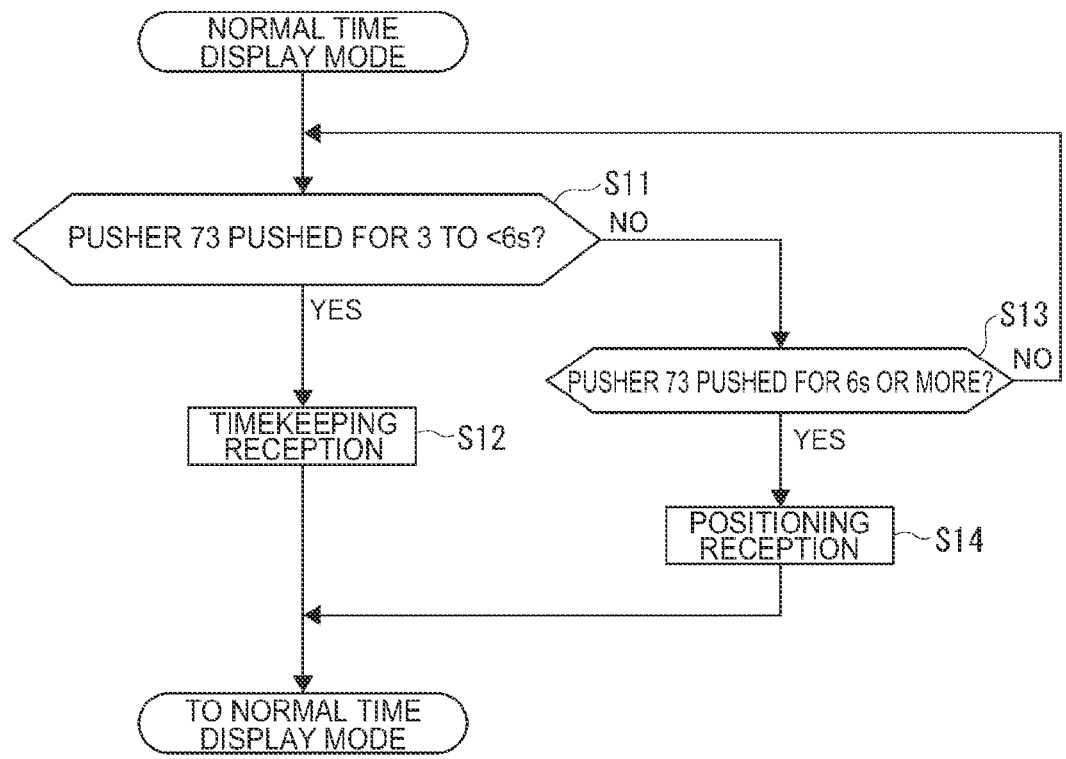
FIG. 6 is a flow chart showing the reception process in an electronic timepiece according to the first embodiment of the invention.
Figure 7:
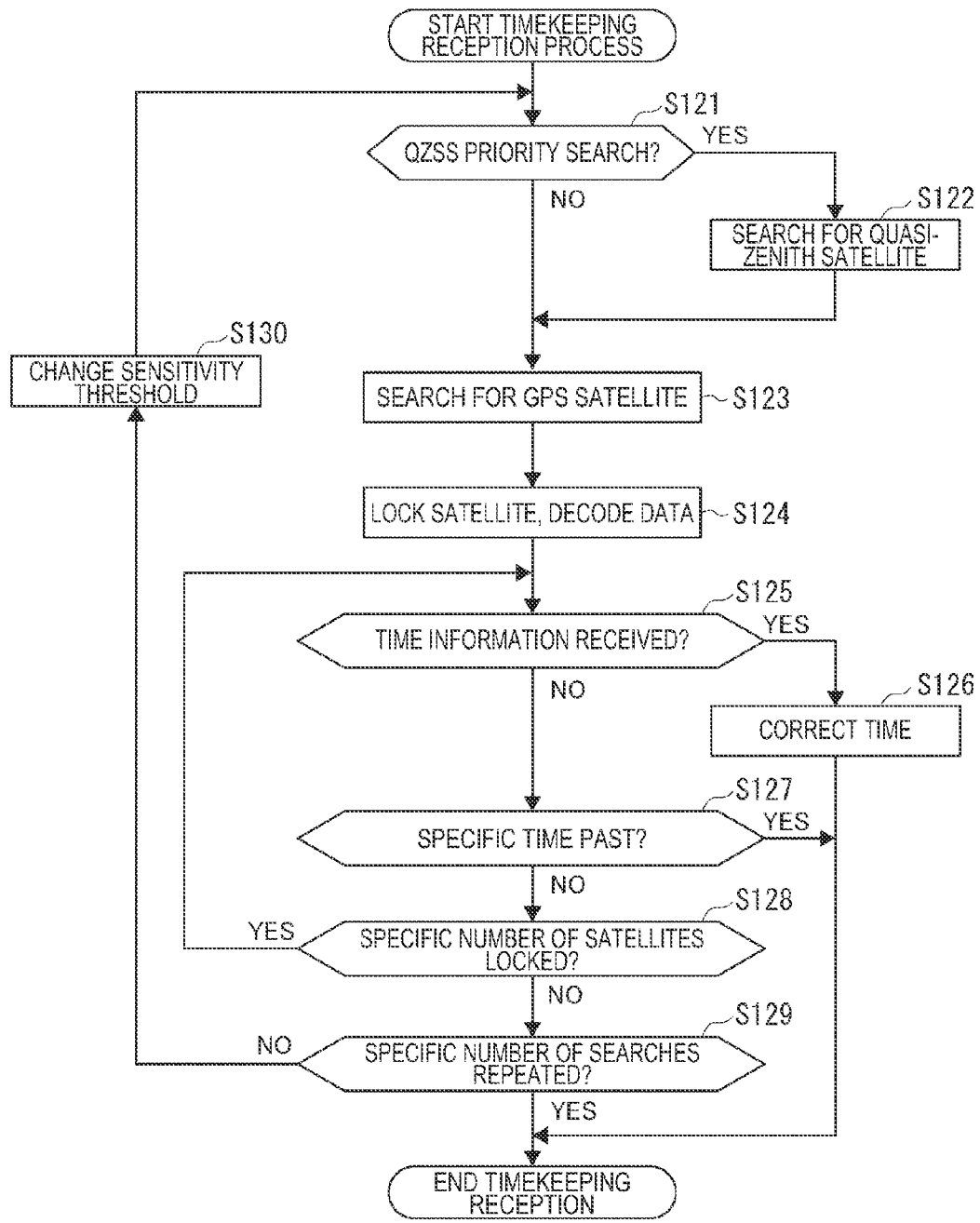
FIG. 7 is a flow chart illustrating the time reception process of an electronic timepiece according to the first embodiment of the invention.

FIG. 6 is a flow chart showing steps in the main reception process, and FIG. 7 is s flow chart showing steps in the timekeeping reception process in the timekeeping reception mode.

Note that the reception process shown in FIG. 6 is a manual reception process executed by the manual reception control unit 412 of the reception control unit 41.

When time is displayed normally by the hands 21, 22, 23 (the normal time display mode), the manual reception control unit 412 determines if the pusher 73 was pressed by the user for the first set time (3 seconds or more and less than 6 seconds) (S11). If it is determined that the pusher 73 was pressed by the user for the first set time (S11 returns YES), the manual reception control unit 412 executes the timekeeping reception process (S12).

If it is determined that the pusher 73 was not pressed by the user for the first set time (S11 returns NO), the manual reception control unit 412 determines if the pusher 73 was pressed by the user for the second set time (6 seconds or more) (S13). If it is determined that the pusher 73 was pressed by the user for the second set time (S13 returns YES), the manual reception control unit 412 executes the positioning reception process (S14).

If in step S13 the manual reception control unit 412 determines the pusher 73 was not pressed by the user for the second set time (S13 returns NO), the manual reception control unit 412 returns to step S11. More specifically, the manual reception control unit 412 constantly checks if the pusher 73 is pressed for the first set time or the second set time when in the normal time display mode, and continues displaying the normal time until the pusher 73 is pressed by the user for the first set time or the second set time.

When the timekeeping reception process of step S12 or the positioning reception process of step S14 completes, the manual reception control unit 412 then returns to the normal time display mode displaying the time normally.

Timekeeping Reception Process

The timekeeping reception process of step S12 is described next. Note that the timekeeping reception process is the same during manual reception control and during automatic reception control. Further note that as described above the reception control unit 41 controls reception during a cold start when it is not known which satellites transmitting satellite signals that can be received are in the sky above.

First, as shown in FIG. 7, the reception control unit 41 determines whether or not to prioritize searching for a quasi-zenith satellite 101 in the Quasi-Zenith Satellite System (QZSS) (S121). More specifically, the reception control unit 41 controls the region determination unit 43, and based on the time zone data 650 stored in the time data storage unit 600 of the storage device 60, determines if the current location is in a region where satellite signals transmitted from a quasi-zenith satellite 101 in the QZSS can be received.

The relationship between time zones and regions where QZSS searching is prioritized is described next. FIG. 8 shows the relationship between time zones and regions where QZSS searching is prioritized.

FIG. 8 is a table showing the time zones set for particular cities (regions), and whether searching for GPS or QZSS positioning information satellites should be prioritized in each time zone. For example, if positioning information is acquired by the positioning reception process in step S14 and the user is in Tokyo, the time zone is +9 hours, and the user is in a region where searching for a quasi-zenith satellite 101 in the QZSS should be prioritized. However, if the user is in London, the time zone is 0, and the user is in a region where searching for a GPS satellite 100 in the GPS should be prioritized. The region determination unit 43 thus determines whether the current location is in a region where satellite signals transmitted from a QZSS quasi-zenith satellite 101 can be received based on the relationship to the time zone data 650.

Note that the relationship between time zones and regions where QZSS searching is prioritized is stored in the time zone data storage unit 680.

Referring again to FIG. 7, if the region determination unit 43 determines in step S121 that the region where the user is located is a region where satellite signals from a QZSS quasi-zenith satellite 101 can be received, the reception control unit 41 determines to prioritize a QZSS search (S121 returns YES). As a result, the reception control unit 41 controls the reception device 122 and first searches for a quasi-zenith satellite 101 (S122).

The first search for positioning information satellites (GPS satellites 100 and quasi-zenith satellites 101) is done with a sensitivity threshold of −130 dBm. More specifically, the reception device 122 searches for a positioning information satellite with a high satellite signal reception level. A positioning information satellite can therefore be locked onto in a short time if there is a positioning information satellite with a high signal reception level (that is, a quasi-zenith satellite 101 or a GPS satellite 100 located near the zenith).

However, if the region determination unit 43 determines in step S121 that the region where the user is located is a region where satellite signals from a QZSS quasi-zenith satellite 101 cannot be received, the reception control unit 41 determines to not prioritize a QZSS search (S121 returns NO). In this event, the reception control unit 41 controls the reception device 122 and searches for a GPS satellite 100 in the GPS (S123).

As when searching for a quasi-zenith satellite 101 in step S122, the reception control unit 41 controls the reception device 122 and executes the GPS satellite 100 search process.

FIG. 9A shows an example of a priority search for a QZSS quasi-zenith satellite 101, and FIG. 9B shows an example of a search for only GPS satellites 100 in the GPS.

More specifically, when it is determined in step S121 to prioritize searching for QZSS quasi-zenith satellites 101 (S121 returns YES), the reception control unit 41 controls the reception device 122 and, as shown in FIG. 9A, searches in the search order first for quasi-zenith satellites 101 of satellite numbers (PRN) 193,194 (S122), and then searches for GPS satellites 100 of satellite numbers (PRN) 1 to 32 (S123). The pseudorandom noise code (PRN) is used as the satellite number in this embodiment of the invention. Note that FIG. 9A shows an example of searching for only two quasi-zenith satellites 101, but the number of quasi-zenith satellites 101 that are searched for may be set according to the number of quasi-zenith satellites 101 in use.

However, if it is determined in step S121 to not prioritize searching for QZSS quasi-zenith satellites 101 (S121 returns NO), the reception control unit 41 controls the reception device 122 and, as shown in FIG. 9B, searches in the search order for GPS satellites 100 of satellite numbers (PRN) 1 to 32 (S123) without searching for quasi-zenith satellites 101 of satellite numbers (PRN) 193, 194.

Returning to FIG. 7, the reception control unit 41 sequentially locks onto the positioning information satellites found by the search processes of step S122 and step S123, receives satellite signals from the locked positioning information satellites, and decodes the received data (S124).

Note that while searching for positioning information satellites, the indicator hand 25 points to the type of positioning information satellites that have been found and locked onto. More specifically, the indicator hand 25 points to QZSS if only quasi-zenith satellites 101 are locked; points to GPS if only GPS satellites 100 are locked; and points to QZSS & GPS if both GPS satellites 100 and quasi-zenith satellites 101 are locked.

If it is determined in step S125 that receiving time information in the satellite signal transmitted from a positioning information satellite was successful (S125 returns YES), the reception control unit 41 corrects the current time based on the time information acquired from the satellite signal (S126). If the time information has still not been acquired (S125 returns NO), the reception control unit 41 determines if a specific time has passed since reception started (S127). This specific time may be set to 60 seconds from when reception started, for example. If it is determined that the specific time passed (S127 returns YES), the reception control unit 41 ends the timekeeping reception process.

However, if the specific time has not passed (S127 returns NO), the reception control unit 41 determines if a specific number of satellites have been locked onto (S128). Because the time information can be acquired by acquiring a satellite signal transmitted from at least one positioning information satellite in the timekeeping reception mode, the reception control unit 41 determines, for example, if two positioning information satellites were locked onto. Because the current consumption required to search for satellites is great, searching ends if the specific number of satellites are found, additional positioning information satellites are not searched for, and unnecessary current consumption can be reduced. As a result, if the specific number of satellites are not locked (S128 returns NO), the reception control unit 41 determines if the satellite search has repeated a specific number of times (S129).

As described above, the first search for positioning information satellites (GPS satellites 100 and quasi-zenith satellites 101) in the timekeeping reception process used a sensitivity threshold of −130 dBm. In this embodiment of the invention, if a positioning information satellite (a satellite signal transmitted from a positioning information satellite) is not found at the sensitivity threshold of −130 dBm, a process that gradually lowers the sensitivity threshold so that satellite signals at a lower signal reception level can be acquired is usually executed. For example, the sensitivity threshold is lowered to −135 dBm and then to −140 dBm to repeat the positioning information satellite search a maximum three times in this embodiment of the invention.

As a result, if in step S129 the search has not repeated the specific number of times (S129 returns NO), the reception control unit 41 changes the sensitivity threshold from −130 dBm to −135 dBm (S130). Next, the reception control unit 41 repeats the process from step S121 to S129 above using the lower sensitivity threshold. If again in step S129 the search has not repeated the specific number of times (S129 returns NO), the reception control unit 41 changes the sensitivity threshold from −135 dBm to −140 dBm (S130), and again repeats the process from step S121 to S129 above using this lower sensitivity threshold.

However, if in step S128 it is determined that the specific number of satellites have been locked onto (S128 returns YES), steps S125 to S127 repeat until the time information is received from the satellites that have been locked.

Note that if in step S129 it is determined that the search has repeated the specific number of times (3 times) (S129 returns YES), the reception control unit 41 ends the timekeeping reception process.

In the normal time display mode when not receiving satellite signals, the indicator hand 25 points to the type of positioning information satellites that can be received based on the currently set time zone and the positioning information acquired in the last positioning reception process (S14. For example, if Tokyo is selected as the time zone, the indicator hand 25 points to QZSS & GPS, and if Los Angeles is selected, the indicator hand 25 points to GPS.

Furthermore, when executing the positioning reception process, the reception control unit 41 in this embodiment of the invention searches for GPS satellites 100 and quasi-zenith satellites 101 in a preset sequence instead of prioritizing searching for QZSS quasi-zenith satellites 101 based on the time zone. Quasi-zenith satellites 101 are normally searched for after first searching for GPS satellites 100.

Effect of Embodiment 1

The effect of an electronic timepiece 1 (satellite signal receiving device) according to the first embodiment of the invention is described below.

When the timekeeping reception process starts in this embodiment of the invention, the reception control unit 41 controls the reception device 122 to search for all positioning information satellites in the constellation. If in this event the region determination unit 43 determines that the current location is in a region where satellite signals transmitted from QZSS quasi-zenith satellites 101 can be received, the reception control unit 41 prioritizes searching for quasi-zenith satellites 101, or more specifically searches for quasi-zenith satellites 101 first. The possibility of being able to quickly lock onto a quasi-zenith satellite 101 therefore increases, and the positioning information satellites search process and the satellite signal reception process can be shortened compared with when signals from quasi-zenith satellites 101 are not received or quasi-zenith satellites 101 are not searched for with priority.

More specifically, when acquiring time information, the time information can be acquired if the satellite signal can be received from one positioning information satellite. Therefore, if the location is where signals can be received from a quasi-zenith satellite 101, a quasi-zenith satellite 101 by quickly locked onto by prioritizing searching for quasi-zenith satellites 101, and the satellite signal reception time can be shortened.

If the region determination unit 43 determines the location does not enable receiving QZSS quasi-zenith satellites 101, the reception control unit 41 does not prioritize searching for QZSS quasi-zenith satellites 101, and can therefore lock onto GPS satellites 100 in the GPS before searching for quasi-zenith satellite 101 from which signals cannot be received. Therefore, the probability of being able to complete the search process before searching for quasi-zenith satellites 101 increases even when the location is determined to be where quasi-zenith satellites 101 cannot be locked onto, the positioning information satellite search time can therefore be shortened, and the satellite signal reception time can also be shortened.

In addition, by shortening the time required for the positioning information satellite search process (locking process) and the satellite signal reception process in the timekeeping reception process, power consumption by the reception process can also be reduced. The duration time of the electronic timepiece 1 can therefore be increased.

In this embodiment of the invention the reception control unit 41 controls the reception device 122 to execute the timekeeping reception process or the positioning reception process. In the timekeeping reception process, the reception control unit 41 prioritizes searching for QZSS quasi-zenith satellites 101. In the positioning reception process, the reception control unit 41 does not prioritize searching for quasi-zenith satellites 101, and instead searches for GPS satellites 100 first. Because time information can be acquired by receiving the satellite signal from one positioning information satellite in the timekeeping reception process, a positioning information satellite can be found in a short time and the current time can be quickly acquired when a quasi-zenith satellite 101 can be locked onto by searching first for quasi-zenith satellites 101.

The positioning reception process is more likely to run after moving to a country or location where satellite signals cannot be received from quasi-zenith satellites 101. The time required to search for positioning information satellites can therefore be shortened by prioritizing searching for GPS satellites 100, which can be received in any country. The time required to lock a positioning information satellite, receive the satellite signal, and calculate positioning information based on the received satellite signal can therefore be shortened.

When the region determination unit 43 determines that the current location is not in a region where satellite signals transmitted from QZSS quasi-zenith satellites 101 can be received, this embodiment of the invention searches only for GPS satellites 100. Because this embodiment of the invention therefore does not search for quasi-zenith satellites 101 from which satellite signals cannot be received, the search time for positioning information satellites can be shortened, and power consumption by the search process can be reduced.

This embodiment of the invention enables selecting the time zone by operating the crown 71, and the region determination unit 43 determines whether or not the location is in a region where satellite signals transmitted from quasi-zenith satellites 101 can be received based on the time zone. As a result, the user does not need to determine if the location enables actually receiving signals from quasi-zenith satellites 101, and whether or not a quasi-zenith satellite 101 can be locked can be easily set by the user simply selecting the time zone of the current location with the input device 70.

FIG. 10 is a table showing the search time for one positioning information satellite and the search time per cycle for each sensitivity threshold.

In this embodiment of the invention, if there is a positioning information satellite for which the reception level of the satellite signals transmitted from the positioning information satellite is high, the likelihood is high that this positioning information satellite can be locked in the first search using the high threshold setting.

As shown in FIG. 10, setting a high threshold enables shortening the positioning information satellite search time. As a result, compared with a configuration in which searching is done at a fixed low threshold such as −140 dBm, this embodiment of the invention can quickly lock onto a positioning information satellite with a high reception level.

Because the satellite signal from a locked positioning information satellite is decoded before searching for all positioning information satellites is completed, information can be sequentially received. Furthermore, because signal stability is greater with positioning information satellites transmitting signals with a high reception level, the success rate of receiving the desired information is high. Because a quasi-zenith satellite 101 with a high reception level can therefore be quickly located, reception can be successfully completed quickly by receiving the satellite signal data.

On the other hand, positioning information satellites with a low reception level can also be found by sequentially searching with a lower threshold setting.

The reception time required for the timekeeping reception process is the total of the search time and the decoding time. The decoding time varies according to the performance of the system, but in a battery-powered system is approximately 4 seconds, for example.

In a more specific example, if quasi-zenith satellite 101 of satellite number (PRN) 193 and GPS satellite 100 of satellite number (PRN) 11 that can be locked onto at the reception level of step 1 in FIG. 10 are in range, and QZSS quasi-zenith satellites 101 are searched for first in the order shown in FIG. 9A, the reception time is 4.3 seconds or the sum of the search time (0.3 s) and the decoding time (4 s). However, if GPS satellites 100 are searched for first instead of prioritizing quasi-zenith satellites 101, and the search follows the order shown in FIG. 9B, the reception time is 7.6 seconds, the sum of the search time (3.3 s) and the decoding time (4 s). In other words, the reception time when searching for quasi-zenith satellites 101 is prioritized is approximately half the reception time when not prioritized.

In other words, because the reception time until time information can be acquired in the timekeeping reception process can be shortened in this embodiment of the invention, the time that the user must wait from when reception starts until reception ends can be shortened, and user convenience can be improved.

More specifically, assume that the battery capacity of the storage battery 130 is 20 mAH, current consumption when operating in the normal time display mode is 0.5 µA, current consumption during reception is 30 mA, the reception time when prioritizing the quasi-zenith satellite 101 search is 4.3 s, the reception time when searching without prioritizing quasi-zenith satellites 101 is 7.6 s, and the timekeeping reception process runs once a day. Under these conditions, the duration time of the electronic timepiece 1 when not being charged by the solar panel 135 is approximately 1.1 years (20 mAH/(0.5 µA+30 mA×4.3 s/(60×60×24)s)/24/365) when prioritizing the quasi-zenith satellite 101 search, and is approximately 0.7 year (20 mAH/(0.5 µA+30 mA×7.6 s/(60×60×24)s)/24/365) when not prioritizing the quasi-zenith satellite 101 search. More specifically, the invention can increase the duration time of the electronic timepiece 1.

Embodiment 2

An electronic timepiece 1 according to a second embodiment of the invention is described next with reference to the accompanying figures.

Figure 11:
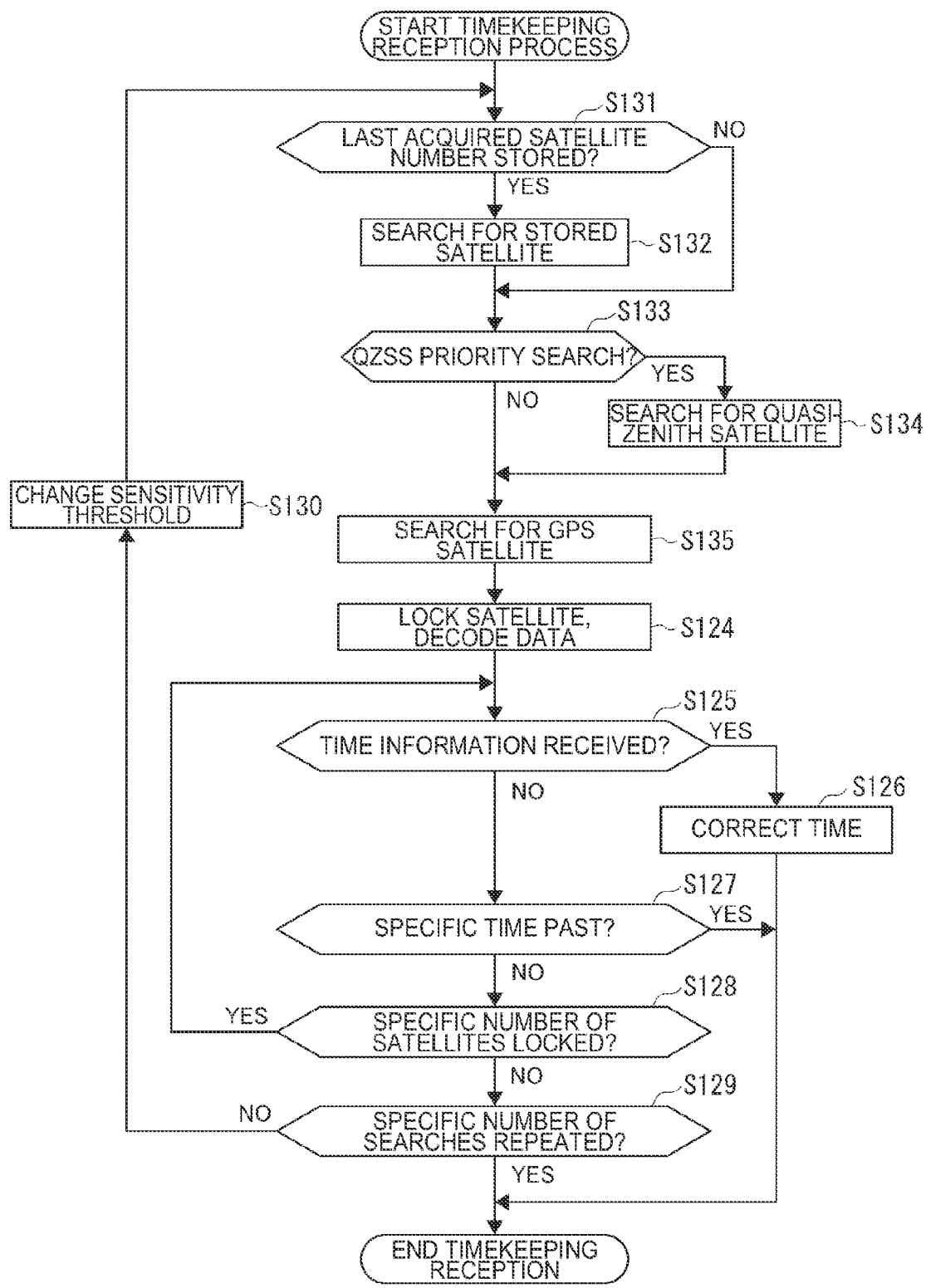
FIG. 11 is a flowchart illustrating a time reception process of the electronic timepiece according to a second embodiment of the invention.

FIG. 11 is a flow chart showing the timekeeping reception process of a electronic timepiece 1 according to the second embodiment of the invention.

The steps in the timekeeping reception process of the electronic timepiece 1 according to the second embodiment of the invention differ from in the first embodiment. Note that steps that are the same as in the timekeeping reception process of the first embodiment are identified by like reference numerals, and further description thereof is omitted below. The differences between this and the first embodiment, specifically only the timekeeping reception process of the second embodiment, is described below.

Timekeeping Reception Process

As shown in FIG. 11, the reception control unit 41 first determines if the satellite number (PRN) of a positioning information satellite that was previously locked onto is stored in the satellite number storage unit 660 (S131). If it is determined that the previously acquired satellite number (PRN) of a positioning information satellite is stored in the satellite number storage unit 660 (S131 returns YES), the reception control unit 41 controls the reception device 122 to search for the positioning information satellite of the satellite number (PRN) stored in the satellite number storage unit 660 (in this example, the GPS satellite 100 of satellite number (PRN) 5, and the quasi-zenith satellite 101 of satellite number (PRN) 196) (S132).

Note that a quasi-zenith satellite 101 of the stored satellite number (PRN) is searched for if only a quasi-zenith satellite 101 is stored in the satellite number storage unit 660. If both a GPS satellite 100 and a quasi-zenith satellite 101 are stored in the satellite number storage unit 660, both positioning information satellites are searched for. In this event, the quasi-zenith satellite 101 may be searched for first, or the GPS satellite 100 may be searched for first.

However, if a previously acquired satellite number (PRN) of a positioning information satellite is not found in the satellite number storage unit 660 in step S131 (S131 returns NO), or if searching for the positioning information satellite of the satellite numbers (PRN) in step S132 ends, the reception control unit 41 determines whether or not to prioritize searching for QZSS quasi-zenith satellites 101 (S133). More specifically, the reception control unit 41 controls the region determination unit 43, and based on the positioning information acquired in the previously positioning reception process, determines if satellite signals transmitted from a quasi-zenith satellite 101 can be received in the current region.

The relationship between time zone blocks and regions where searching for QZSS quasi-zenith satellites 101 is prioritized is described next. FIG. 12 shows the time zone blocks related to the current position acquired by the positioning reception process overlaid on map data, and whether GPS or QZSS satellites are searched for first (prioritized) in each time zone block.

More specifically, FIG. 12 shows map data divided into 80 time zone blocks of a specific size each, the time zone of each time zone block, and whether searching for GPS satellites 100 in the GPS or searching for quasi-zenith satellites 101 in the QZSS should be prioritized in each time zone block.

For example, if positioning information is acquired by the positioning reception process in step S14 in FIG. 6 and the acquired positioning information is determined to be in block 5-B, block 5-B is determined to be time zone +9 because block 5-B is set to time zone +9. Block 5-B is also known to be a region where searching for QZSS quasi-zenith satellites 101 is prioritized. If the acquired positioning information is located in block 1-H, the time zone is determined to be +6 because block 1-H is set to time zone +6. Block 1-H is also known to be a region where searching for GPS satellites 100 in the GPS is prioritized.

More specifically, if satellite signals from QZSS quasi-zenith satellites 101 can be received in the region based on the GPS or QZSS search priority setting for each time zone block (see FIG. 12), the region determination unit 43 determines the region is one where searching for quasi-zenith satellites 101 should be prioritized.

This relationship between time zone blocks and regions where searching for QZSS quasi-zenith satellites 101 is prioritized is stored in the time zone data storage unit 680.

Referring again to FIG. 11, if the region determination unit 43 determines in step S133 that the acquired positioning information indicates a time zone block where satellite signals from a QZSS quasi-zenith satellite 101 can be received, the reception control unit 41 determines to prioritize a QZSS search (S133 returns YES). As a result, the reception control unit 41 controls the reception device 122 and searches for only quasi-zenith satellites 101 (S134) as in the first embodiment.

However, if the region determination unit 43 determines in step S133 that the acquired positioning information indicates a time zone block where satellite signals from a QZSS quasi-zenith satellite 101 cannot be received, the reception control unit 41 determines to not prioritize a QZSS search (S133 returns NO). In this event, the reception control unit 41 controls the reception device 122 and searches for only GPS satellites 100 (S135).

More specifically, if it is determined in step S131 that the satellite number (PRN) of a positioning information satellite that was previously locked onto is stored in the satellite number storage unit 660 (S131 returns YES), the positioning information satellite stored in the satellite number storage unit 660 is searched for (S132). If the reception control unit 41 determines in step S133 to prioritize searching for QZSS quasi-zenith satellites 101 (S133 returns YES), the reception control unit 41 controls the reception device 122 to search for the GPS satellite 100 of satellite number (PRN) 5, and the quasi-zenith satellite 101 of satellite number (PRN) 196), that are stored in the satellite number storage unit 660 as shown in FIG. 13A. Next, the reception control unit 41 prioritizes searching for quasi-zenith satellites 101 of satellite numbers (PRN) 193 and 194, which are not stored in the satellite number storage unit 660, and then searches for GPS satellites 100 of satellite numbers (PRN) 1 to 32 (not including satellite number (PRN) 5), which are not stored in the satellite number storage unit 660 (S134).

However, if in step S133 the reception control unit 41 determines to not prioritize searching for quasi-zenith satellites 101 (S133 returns NO), the reception control unit 41 controls the reception device 122 to search for GPS satellite 100 of satellite number (PRN) 5 and then search for quasi-zenith satellite 101 of satellite number (PRN) 196 as shown in FIG. 13B. Next, the reception control unit 41 sequentially searches for GPS satellites 100 of satellite numbers (PRN) 1 to 32 (not including satellite number (PRN) 5) without searching for quasi-zenith satellites 101 (S135).

Referring again to FIG. 11, the reception control unit 41 then executes step S124 to step S130 in the same way as in the first embodiment described above. Note that step S124 in this embodiment includes a process for storing the satellite numbers (PRN) of the satellites that are found in the satellite number storage unit 660.

Note that if satellite numbers are stored in the satellite number storage unit 660 when the positioning reception process is executed, the positioning information satellites of those satellite numbers are searched for as in the timekeeping reception process, and then GPS satellites 100 and quasi-zenith satellites 101 may be searched for sequentially without prioritizing searching for quasi-zenith satellites 101.

Effect of Embodiment 2

In addition to the effect of the first embodiment described above, this embodiment of the invention also has the following effect.

The electronic timepiece 1 according to this embodiment stores the satellite numbers (PRN) of the positioning information satellites that are locked onto by the reception device 122 in the satellite number storage unit 660, and the reception control unit 41 first searches for the positioning information satellites that are stored in the satellite number storage unit 660 when the reception process starts. As a result, if conditions enable receiving signals from the same positioning information satellites, such as when the reception process executes at the same time as the last time, the time required to lock onto a positioning information satellite can be shortened and the power consumption required for searching can be reduced.

Furthermore, because whether or not the current location is in a time zone where a quasi-zenith satellite 101 can be found is determined and the search process is controlled accordingly when a positioning information satellite stored in the satellite number storage unit 660 cannot be locked onto, the time required to lock onto a positioning information satellite can be shortened and the power consumption required for searching can be reduced.

Furthermore, because the relationship between time zone blocks and regions where searching for QZSS quasi-zenith satellites 101 is prioritized can be set with greater granularity than the relationship between time zones and regions where searching for QZSS satellites is prioritized used in the first embodiment, whether or not searching for quasi-zenith satellites 101 is prioritized can be determined more accurately.

Note that while a process that stores the satellite numbers of satellites that have been locked onto in the satellite number storage unit 660 is executed in step S124 in the embodiment described above, storing only the satellite numbers of the satellites from which time information is successfully acquired in the satellite number storage unit 660 in step S125 is also conceivable.

Embodiment 3

A electronic timepiece 1 according to a third embodiment of the invention is described next with reference to the accompanying figures.

Figure 14:
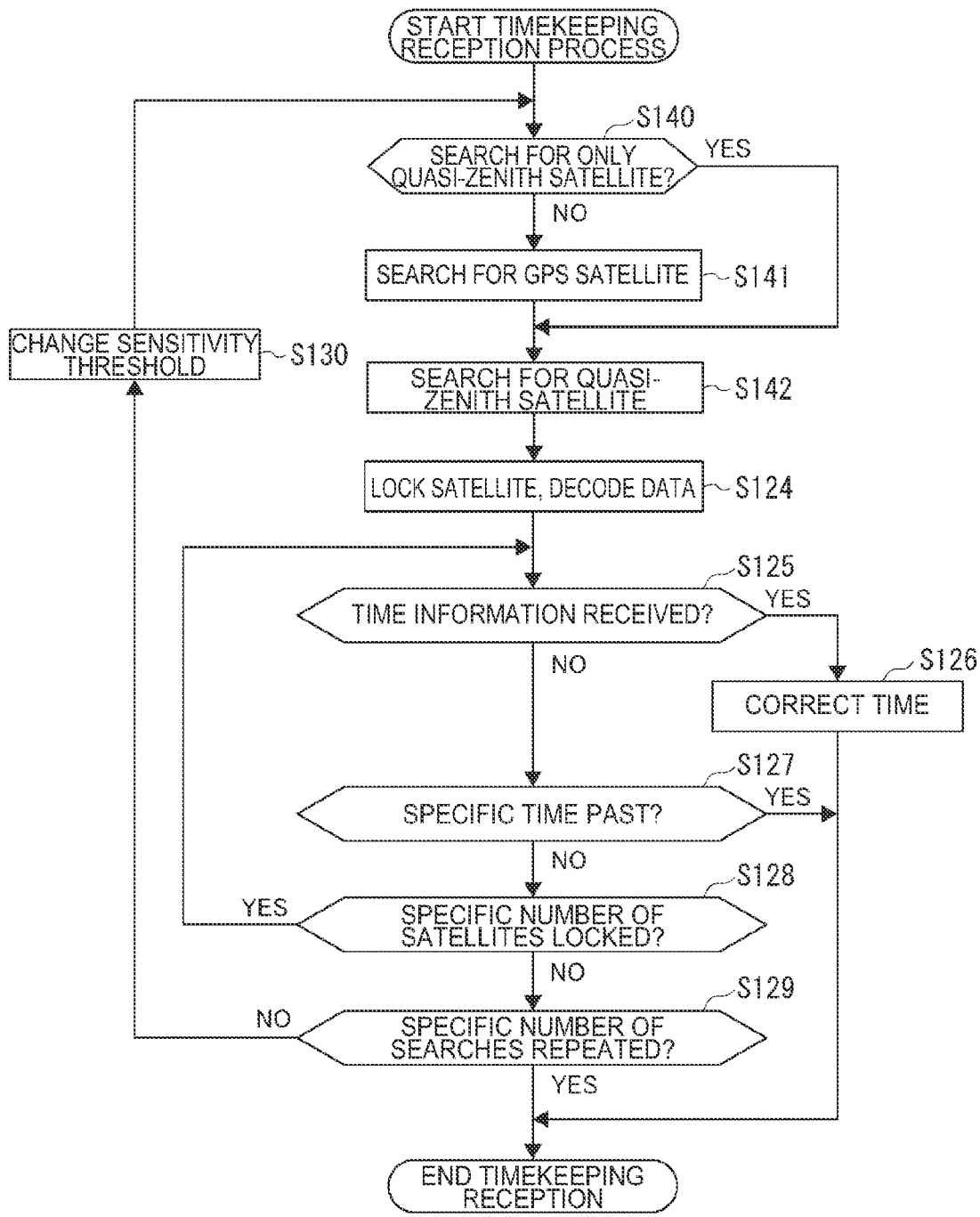
FIG. 14 is a flowchart illustrating a time reception process of an electronic timepiece according to the third embodiment of the invention.

FIG. 14 is a flow chart showing steps in the timekeeping reception process of an electronic timepiece 1 according to the third embodiment of the invention.

The electronic timepiece 1 according to the third embodiment of the invention differs from the foregoing embodiments in the steps of the timekeeping reception process. Note that steps that are the same as in the timekeeping reception process of the first embodiment are identified by like reference numerals, and further description thereof is omitted below. The differences between this and the first embodiment, specifically only the timekeeping reception process, is described below.

First, as shown in FIG. 14, the reception control unit 41 determines by the region determination unit 43 whether or not to search for only QZSS quasi-zenith satellites 101 (S140). More specifically, if this decision is to search for only quasi-zenith satellites 101 (S140 returns YES), the reception control unit 41 controls the reception device 122 and searches for only quasi-zenith satellites 101 (S142). More specifically, the reception control unit 41 sequentially searches for only quasi-zenith satellites 101 of satellite numbers (PRN) 193 to 197 as shown in FIG. 15A.

However, if in step S140 the region determination unit 43 determines not to search for only QZSS quasi-zenith satellites 101 (S140 returns NO), the reception control unit 41 searches first for GPS satellites 100 of satellite numbers (PRN) 1 to 31 (S141). After searching for GPS satellites 100, the reception control unit 41 then searches for quasi-zenith satellites 101 of satellite numbers (PRN) 193 and 194 (S142). In other words, when it is determined to not search for only quasi-zenith satellites 101, the reception control unit 41 first searches for GPS satellites 100 as shown in FIG. 15B, and then sequentially searches for quasi-zenith satellites 101 of satellite numbers (PRN) 193 to 197 as shown in FIG. 15A.

The reception control unit 41 then executes step S124 to step S130 in the same way as in the first embodiment described above. Note that when the sensitivity threshold is changed in step S130, the reception control unit 41 repeats step S121, steps S141 and S142, and steps S124 to S128.

Note also that the positioning reception process may be executed in the same way as described in the first embodiment.

Effect of Embodiment 3

In addition to the effects of the embodiments described above, the electronic timepiece 1 according to this embodiment of the invention also has the following effect.

When the region determination unit 43 determines to search for only QZSS quasi-zenith satellites 101 (when a region in which satellite signals transmitted from quasi-zenith satellites 101 is selected), the reception control unit 41 searches for only quasi-zenith satellites 101. As a result, when satellite signals from quasi-zenith satellites 101 can be received, the search process and the reception process can be completed in a short time. In addition, when the reception process is executed in a location where satellite signals from QZSS quasi-zenith satellites 101 cannot be received, such as indoors or underground, the search process and the reception process can be completed in a short time, and continuing a wasteful reception process can be prevented.

Furthermore, when the region determination unit 43 determines to not search for only QZSS quasi-zenith satellites 101 (when a region where receiving satellite signals from quasi-zenith satellites 101 is difficult is selected), the reception control unit 41 first searches for GPS satellites 100, then searches for quasi-zenith satellites 101, and can therefore lock onto at least one type of satellite.

Note, further, that the region determination unit 43 can determine whether or not to search for only quasi-zenith satellites 101 using either the above-described relationship between time zones and regions where searching for QZSS satellites is prioritized, or the relationship between time zone blocks and regions where searching for QZSS satellites is prioritized.

Other Embodiments

The invention is not limited to the foregoing embodiments, and variations and improvements thereof that are within the scope enabling achieving the object of the invention are included in the invention.

The region determination unit 43 decides in the first embodiment described above based on time zone data 650 and the relationship between time zones and regions where searching for QZSS satellites is prioritized, and in the second embodiment decides based on the acquired positioning information and the relationship between time zone blocks and regions where searching for QZSS satellites is prioritized, but the invention is not so limited and may be configured to use either.

Figure 16:
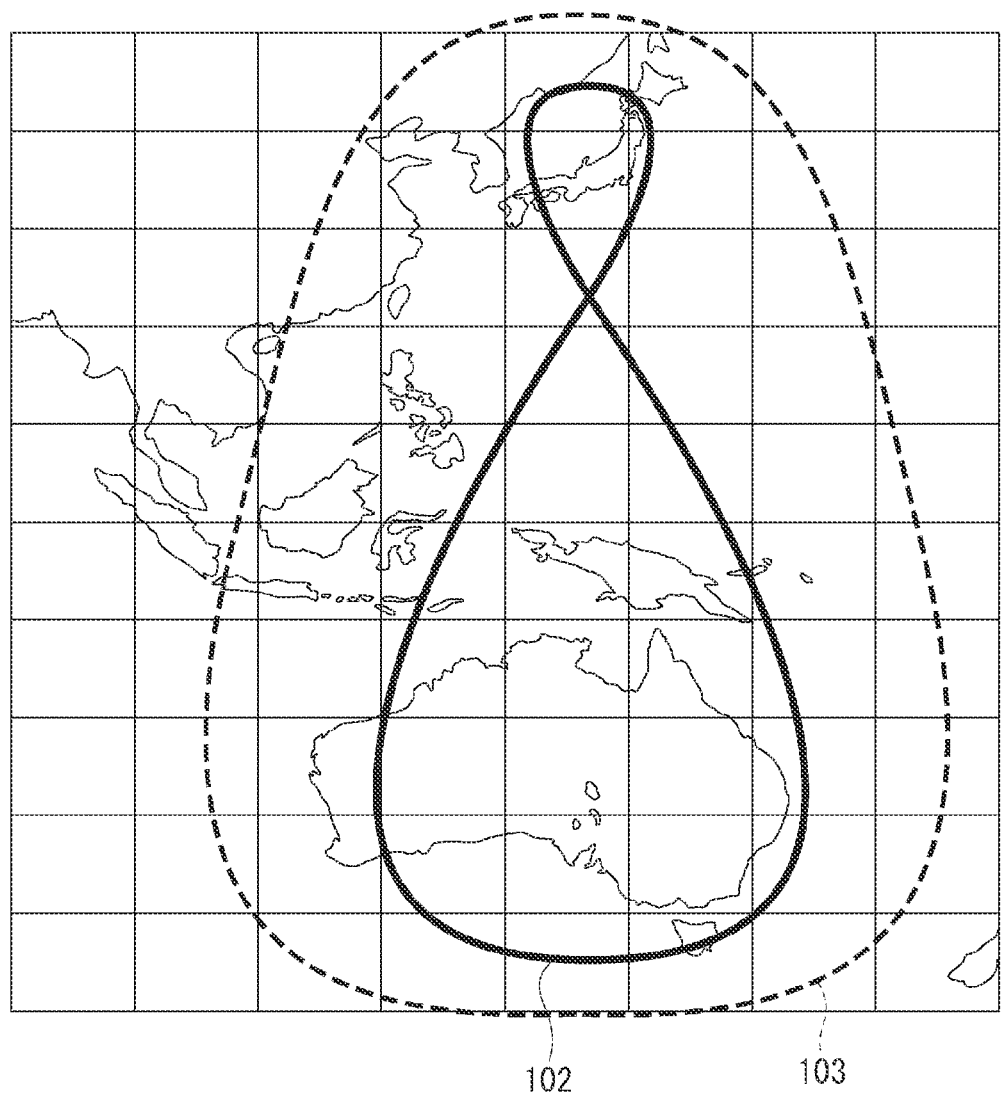
FIG. 16 illustrates an example of orbits of quasi-zenith satellites.

In the second embodiment, searching for QZSS quasi-zenith satellites 101 is prioritized in step S133 when the user is determined to be in a specific time zone block based on the result of position reception, but the invention is not so limited. For example, as shown in FIG. 16, searching for QZSS quasi-zenith satellites 101 may be prioritized when the positioning information (latitude and longitude) acquired by the positioning reception process indicates a location in a specific region 103 without dividing the map data into blocks.

The second embodiment determines whether or not the satellite number (PRN) stored during the last reception process is stored in the satellite number storage unit 660, but the invention is not so limited. For example, if a positioning information satellite could not be found during the last reception process, information of an even earlier reception process may be stored in the satellite number storage unit 660. When a positioning information satellite was locked onto during the last reception process, the record of earlier reception processes may be deleted and overwritten, or a reception record of the last five receptions, for example, may be stored by additionally storing the reception date and time.

Each of the embodiments described above prioritizes searching for QZSS quasi-zenith satellites 101 in the timekeeping reception process, but the invention is not so limited. Searching for quasi-zenith satellites 101 may also be prioritized in the positioning reception process. In the positioning reception process, satellite signals must be received from at least 3 and preferably 4 or more positioning information satellites. Therefore, by prioritizing searching for quasi-zenith satellites 101 in regions where signals from quasi-zenith satellites 101 can be received, a quasi-zenith satellite 101 may be quickly locked onto as one of the four, and GPS satellites 100 may be found as the other three. Compared with searching for four GPS satellites 100, this configuration can shorten the positioning information satellite search time, and can shorten the satellite signal reception time. The power consumption required for searching can therefore be shortened.

The type of positioning information satellite to search for is set in the foregoing embodiments based on whether or not the current location enables receiving signals from QZSS quasi-zenith satellites 101, but the invention is not so limited. For example, the user may determine the type of positioning information satellite to search for by operating the input device 70. As a result, in each of the foregoing embodiments, the decision of whether or not to prioritize searching for QZSS quasi-zenith satellites 101 in steps S121 and S133 may determine to prioritize searching for QZSS quasi-zenith satellites 101 when the user has operated the input device 70 to set the indicator hand 25 to QZSS indicating receiving quasi-zenith satellites 101, or QZSS & GPS indicating receiving from any positioning information satellite among the GPS satellites 100 and quasi-zenith satellites 101. This enables the user to select the desired type of positioning information satellite.

In the foregoing embodiments, the user may determine the type of positioning information satellite to search for by operating the input device 70. When the user operates the input device 70 and sets the indicator hand 25 to GPS, QZSS, or QZSS & GPS, a configuration that searches for only GPS satellites 100 when GPS is selected, searches for only quasi-zenith satellites 101 when QZSS is selected, and searches for positioning information satellites in both the GPS satellite 100 and quasi-zenith satellite 101 constellations when QZSS & GPS is selected, is also conceivable. A configuration that sets the type of positioning information satellites to search for based on whether or not the current location enables reception from QZSS quasi-zenith satellites 101 when QZSS & GPS is selected is also conceivable. For example, if the current location enables reception from QZSS quasi-zenith satellites 101, searching for QZSS quasi-zenith satellites 101 may be prioritized. As a result, the user can select the desired type of positioning information satellite to search for.

A first subdial 112 and a second subdial 113 are separately disposed to the dial 11 of the electronic timepieces 1 in the foregoing embodiments, but the invention is not so limited. For example, a dial that combines the first subdial 112 and the second subdial 113 may be used. More specifically, the QZSS marker may be located adjacent to the 4+ marker of the first subdial 112, the indicator hand 24 point to 1 or 4+ when satellite signal reception starts, and point to QZSS when a QZSS quasi-zenith satellite 101 is locked onto.

In the embodiments described above, the time zone can be selected by operating the crown 71, and the region determination unit 43 determines whether or not the location enables receiving satellite signals transmitted from quasi-zenith satellites 101 based on the time zone. However, the invention is not so limited. For example, information indicating whether or not the region enables receiving satellite signals transmitted from RNSS satellites (QZSS quasi-zenith satellites 101) may be relationally stored to country names, city names, or region names, for example, in the storage device 60. In this configuration, the user can simply select the country name, city name, or region name, for example, by operating the input device 70, and based on the information related to the country names, city names, or region names, the reception control unit 41 can determine whether or not to prioritize searching for quasi-zenith satellites 101, search for GPS satellites 100 or quasi-zenith satellites 101 based on the decision, and receive satellite signals.

The invention is described above using GPS satellites and quasi-zenith satellites as examples of positioning information satellites, but the invention is not so limited. For example, the invention can also be applied using satellites used in the Galileo (EU), GLONASS (Russia), and Beidou (China), and other Global Navigation Satellite Systems (GNSS) as examples of GNSS satellites. The invention can also be applied to IRNSS (India), DORIS (France), Beidou (China, which are non-QZSS systems using quasi-zenith satellites that can be accessed only in specific regions, and to Satellite Based Augmentation System (SBAS) and other types of geostationary satellites as other examples of RNSS satellites.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

The entire disclosure of Japanese Patent Application No. 2014-45498, filed Mar. 7, 2014 is expressly incorporated by reference herein.

What is claimed is:

1. A satellite signal receiving device comprising:
   a reception unit is configured to search for positioning information satellites including a GNSS satellite used in a global navigation satellite system and an RNSS satellite used in a regional navigation satellite system, and receive a satellite signal transmitted from a satellite locked onto by the search;
   a reception control unit is configured to control the reception unit; and
   a region determination unit is configured to determine whether or not the current location is in a region where a satellite signal transmitted from the RNSS satellite can be received;
   the reception control unit prioritizing searching for an RNSS satellite when the region determination unit determines the current location is in a region where satellite signal transmitted from the RNSS satellite can be received; wherein
   the reception control unit is configured to execute a timekeeping reception process that acquires current time information from the satellite signal, and a positioning reception process that acquires positioning information based on the satellite signal; and
   when the region determination unit determines the current location is in a region where satellite signal transmitted from the RNSS satellites can be received, the reception control unit prioritizes searching for the RNSS satellite during the timekeeping reception process, and does not prioritize searching for the RNSS satellite during the positioning reception process.

2. The satellite signal receiving device described in claim 1, wherein:
   when the region determination unit determines the current location is in a region where satellite signals transmitted from the RNSS satellite can be received, the reception control unit searches for an RNSS satellite in each of search cycles 1 to x/2, where x is 2 or more and represents the number of positioning information satellites available and total number of search cycles.

3. The satellite signal receiving device described in claim 1, further comprising:
   a storage unit stores a positioning information satellite;
   the reception control unit searching for the positioning information satellite stored in the storage unit first, then searching for an RNSS satellite not stored in the storage unit, and then searching for a GNSS satellite not stored in the storage unit, when the region determination unit determines the current location is in a region where satellite signals transmitted from the RNSS satellite can be received.

4. The satellite signal receiving device described in claim 1, wherein:
   the reception control unit searches first for the RNSS satellite, then searches for a GNSS satellite, when the region determination unit determines the current location is in a region where satellite signal transmitted from the RNSS satellite can be received.

5. The satellite signal receiving device described in claim 1, wherein:
   when the region determination unit determines the current location is not in a region where satellite signal transmitted from the RNSS satellite can be received, the reception control unit prioritizes searching for the GNSS satellite.

6. The satellite signal receiving device described in claim 1, wherein:
   when the region determination means determines the current location is not in a region where satellite signal transmitted from the RNSS satellite can be received, the reception control unit searches for only the GNSS satellite.

7. The satellite signal receiving device described in claim 1, further comprising:
   an external operating unit operated by a user;
   wherein the region determination unit determines whether or not the current location is in a region where satellite signal transmitted from the RNSS satellite can be received based on the time zone selected by the user operating the external operating unit.

8. The satellite signal receiving device described in claim 1, wherein:
the reception control unit is configured to execute a timekeeping reception process that acquires current time information from the satellite signal, and a positioning reception process that acquires positioning information based on the satellite signal; and
the region determination unit determines whether or not the current location is in a region where satellite signal transmitted from the RNSS satellite can be received based on positioning information acquired by successfully executing a previous positioning reception process.

9. The satellite signal receiving device described in claim 1, further comprising:
a display unit is configured to display the type of positioning information satellite locked onto.

10. The satellite signal receiving device described in claim 1, further comprising:
an external operating unit operated by a user;
the reception control unit selecting a positioning information satellite to search for by the reception unit based on user operation of the external operating unit.

11. An electronic timepiece comprising:
a reception unit is configured to search for positioning information satellites including a GNSS satellite used in a global navigation satellite system and an RNSS satellite used in a regional navigation satellite system, and receive a satellite signal transmitted from a satellite locked onto by the search;
a reception control unit is configured to control the reception unit;
a region determination unit is configured to determine whether or not the current location is in a region where a satellite signal transmitted from the RNSS satellite can be received; and
a timekeeping unit that keeps time;
the reception control unit prioritizing searching for an RNSS satellite when the region determination unit determines the current location is in a region where satellite signal transmitted from the RNSS satellite can be received; wherein
the reception control unit is configured to execute a timekeeping reception process that acquires current time information from the satellite signal, and a positioning reception process that acquires positioning information based on the satellite signal; and
when the region determination unit determines the current location is in a region where satellite signal transmitted from the RNSS satellites can be received, the reception control unit prioritizes searching for the RNSS satellite during the timekeeping reception process, and does not prioritize searching for the RNSS satellite during the positioning reception process.

12. A satellite signal receiving device comprising:
a reception unit is configured to search for a positioning information satellites including a GNSS satellite used in a global navigation satellite system and an RNSS satellite used in a regional navigation satellite system, and receive a satellite signal transmitted from a satellite locked onto by the search;
a reception control unit is configured to control the reception unit; and
a region determination unit is configured to determine whether or not the current location is in a region where a satellite signal transmitted from the RNSS satellite can be received;
the reception control unit searching only for the RNSS satellite when the region determination unit determines the current location is in a region where satellite signal transmitted from the RNSS satellites can be received; wherein
the reception control unit is configured to execute a timekeeping reception process that acquires current time information from the satellite signal, and a positioning reception process that acquires positioning information based on the satellite signal; and
when the region determination unit determines the current location is in a region where satellite signal transmitted from the RNSS satellites can be received, the reception control unit prioritizes searching for the RNSS satellite during the timekeeping reception process, and does not prioritize searching for the RNSS satellite during the positioning reception process.

* * * * *